United States Patent
Mo et al.

(10) Patent No.: US 12,431,779 B2
(45) Date of Patent: Sep. 30, 2025

(54) BASE WITH INTEGRATED COILS AND THE MOTOR WITH THE SAME

(71) Applicant: SUZHOU GYZ ELECTRONIC TECHNOLOGY CO., LTD., Suzhou (CN)

(72) Inventors: Couquan Mo, Suzhou (CN); Liang Shi, Suzhou (CN); Yebeizi Geng, Suzhou (CN)

(73) Assignee: SUZHOU GYZ ELECTRONIC TECHNOLOGY CO., LTD., Suzhou (CN)

( * ) Notice: Subject to any disclaimer, the term of this patent is extended or adjusted under 35 U.S.C. 154(b) by 200 days.

(21) Appl. No.: 18/238,327

(22) Filed: Aug. 25, 2023

(65) Prior Publication Data

US 2023/0412060 A1    Dec. 21, 2023

Related U.S. Application Data

(63) Continuation of application No. PCT/CN2022/128941, filed on Nov. 1, 2022.

(30) Foreign Application Priority Data

Apr. 1, 2022  (CN) .......................... 202220756651.3
Jul. 14, 2022  (CN) .......................... 202210824029.6

(51) Int. Cl.
*H02K 41/035*    (2006.01)

(52) U.S. Cl.
CPC ................. *H02K 41/0354* (2013.01)

(58) Field of Classification Search
CPC ........ H02K 41/035; H02K 3/46; H02K 33/00; H02K 11/215
USPC ...... 310/12.07, 12.16–12.17, 12.21, 36, 152, 310/208
See application file for complete search history.

(56) References Cited

FOREIGN PATENT DOCUMENTS

| CN | 107991752 A | | 5/2018 | |
|----|-------------|---|--------|---|
| CN | 111010017 A | * | 4/2020 | ............... G02B 7/09 |
| CN | 112803646 A | * | 5/2021 | ............ G02B 23/08 |
| CN | 115118113 A | | 9/2022 | |
| CN | 217388385 A | | 9/2022 | |
| KR | 20120090378 A | * | 8/2012 | |

* cited by examiner

*Primary Examiner* — Jose A Gonzalez Quinones
(74) *Attorney, Agent, or Firm* — SZDC Law PC

(57) ABSTRACT

A base with integrated coils and the motor with the same is provided, the base with integrated coils comprises: an insulating base, a metal circuit, a coil electronically connecting to the metal circuit. The coil comprises an initial lead, an end lead and a coil body connecting the initial lead and the end lead. The insulating base is configured with an accommodating slot for the initial lead, which extends from the position where the coil body starts winding. Provided base with integrated coils is configured with an accommodating slot for initial leads. And even if the initial lead is placed at the bottom of the coil body, it will not affect the stability of the coil body. Thus, the coil body will not easily shake.

27 Claims, 18 Drawing Sheets

BASE WITH INTEGRATED COILS AND THE MOTOR WITH THE SAME

CROSS-REFERENCE TO RELATED APPLICATIONS

This application is a bypass continuation of PCT/CN2022/128941, filed on Nov. 1, 2022, which claims the priority of the Chinese application No. 202210824029.6, filed on Jul. 14, 2022, and the Chinese application No. 202220756651.3, filed on Apr. 1, 2022, all of which are incorporated into this specification by reference.

TECHNICAL FIELD

The present disclosure related to the technical field of a base with integrated coils and the motor with the same, and in particular to a base with integrated coils and the motor with the same for the field of electronic devices.

BACKGROUND

Camera modules are essential components of electronic devices such as smartphones, tablets, and other devices with camera functionality. In existing technology, to achieve miniaturization of the camera module's overall size, a coil is often placed on the motor base. When an electric current passes through the coil, it generates a driving torque, which works in conjunction with a magnet to create a magnetic field around the coil.

Existing bases with coils and the motors with the same typically include a base, metal circuits molded within the base, electronic components soldered to the metal circuits, coils mounted on the base, and magnetic structures that interact with the coils as driving components. Motor assembly manufacturers usually need to perform electrical assembly of these basic components. For example, they need to position the two leads of the coil, formed by winding wire, onto corresponding solder pads of the respective branches of the metal circuit and achieve precise soldering. The coils placed on the base are typically hollow coils or on-site winding coils. The coil needs to extend a starting lead from the initial winding position to connect with the circuit and also extend an end lead from the final winding position to connect with the circuit. In the actual production of coils, the winding is done from bottom to top and from the inside out. This means that the initial lead of the coil is located at the bottom and innermost layer, while the end lead is located at the top and outermost layer of the coil. The difference in relative height between the two leads of the coil results in a different solder distance between them and the solder pins of the branch circuits in the same horizontal plane.

In addition, coils are generally wound layer by layer from the bottom up, and the initial lead is usually positioned below the bottommost layer of the coil. When the coil is placed on the motor base, it tends to be unstable and susceptible to shaking, which hinders a stable connection between the coil and the circuit.

For example, CN113193723A disclosed a first coil positioned on a base, in which the first coil is configured in a quantity of four and is electrically connected through connection parts to conductive elements. The second coil is connected and conductive to the first coil; the two leads of the first coil are soldered to the solder pins of the conductive elements corresponding to the leads; specifically, the two leads of the first coil are soldered to the two solder pins of the conductive elements, which are at the same height in the vertical direction.

CN110098710A discloses: each side of the base is soldered with a coil, and the two coils are electrically connected to the terminals in the base; the terminals contain a three-section structure, with one section being a semicircular conduit for conducting the two coils, and the other two sections connecting the coils and the positive and negative poles of the power source. This application can only achieve the function of the vertical focusing for motor products by these two featured coils; besides that, it has poor anti-vibration effects; additionally, the two coils are arranged vertically, and each coil's two leads are soldered to a pair of solder pins horizontally arranged on the terminals, which are at the same height.

In these two prior arts, all the coil leads are soldered to a pair of solder pins at the same level. However, they fail to consider the height difference of the lead wires of wound-type coils in the direction of coil thickness, which results in varying soldering distances between the leads and the solder pins. The difference in soldering distances between the leads and solder pins could cause several issues: the longer soldering distance of the end lead at a relatively higher position can cause unreliable soldering or even breakage, thus impacting product performance and lifespan; moreover, an excessively long soldering distance can degrade the signal effectiveness of the coil, thereby affecting the precision of motor movement; besides that, the initial lead at a relatively lower position which is located at the bottommost layer of the coil and across the inner and outer layers of the coil could cause the coil to tilt when placed on the base, resulting in coil instability. To prevent coil tilting, adhesive adjustments are typically applied to the bottom of the coil to create stepped surfaces. However, the presence of these stepped surfaces could lead to the breaking of the initial lead during the soldering process, subsequently affecting the reliability and lifespan of the product.

Therefore, it is necessary to provide a new motor and base with integrated coils to overcome the above-mentioned defects.

SUMMARY

This disclosure provided a base with integrated coils and the motor thereof. The base with integrated coils is configured with an accommodating slot for initial lead of the coil, and the accommodating slot extends from the initial winding position of the coil body, thereby solving the problem of coil shaking and instability caused by the initial lead of the coil being located beneath the bottom layer of the coil.

The objection of this disclosure could be achieved by the following technical solution I.

A base with integrated coils, comprising: a coil, including an initial lead, an end lead, and a coil body connecting the initial lead and the end lead; an insulating base, configured with an accommodating slot for the initial lead, which extends from the position where the coil body starts winding; a metal circuit, embedded within the insulating base; wherein the coil is fixed onto the insulating base and electrically connected to the metal circuit.

The objection of this disclosure could be achieved by the following technical solution II.

A motor, comprising: a base with integrated coils afore mentioned, a shell body, configured above the base with integrated coils; a movable module, used to accommodate the shell body, further comprising a magnetic element cooperating with coil.

Compared to existing technologies, by configurating an accommodating slot for the initial lead in the insulating base, which extends from the position where the coil body starts winding, the coil body could be steady placed on the insulating base, even when the initial lead is located beneath the bottom layer of the coil body, thereby solving the problem of coil vibrating and instability resulting from the initial lead. Therefore, the coil body

DRAWINGS

SPECIFIC EMBODIMENTS

Figure 1:
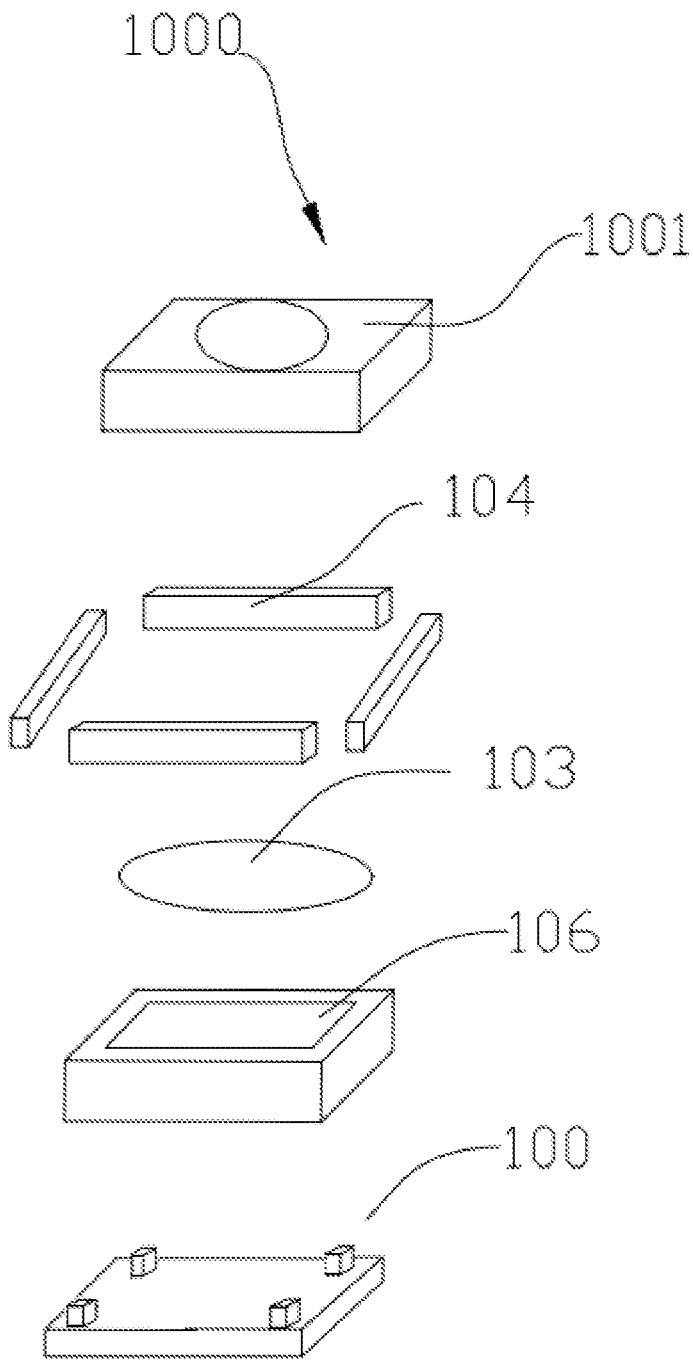
FIG. 1 is the schematic perspective view for the motor with a base comprising integrated coils in one embodiment of the present disclosure.
Figure 2:
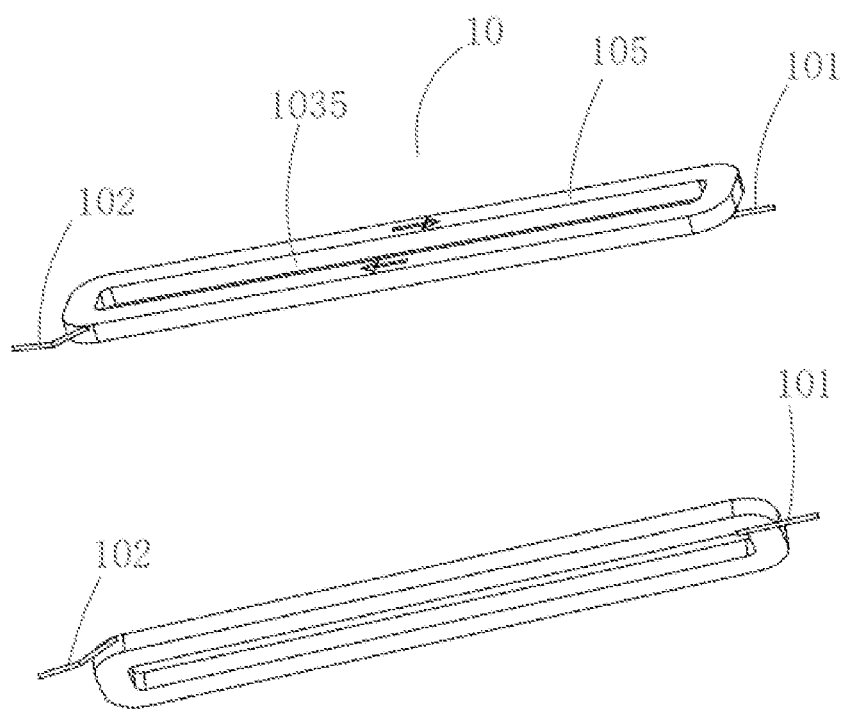
FIG. 2 is the schematic perspective view for the winding coils of the base with integrated coils in one embodiment of the present disclosure.

In the description of the present disclosure, it should be noted that the terms "up," "lower," "inner," "outer," and similar directional or positional relationships are based on the orientation or positional relationships shown in the accompanying drawings. They are only used for the purpose of describing the present disclosure and simplifying the description, and do not indicate or imply that the device or component must have a specific orientation, nor be constructed or operated in a specific orientation. Therefore, they should not be understood as limitations on the present disclosure.

In the description of the present disclosure, it should be noted that unless otherwise explicitly specified and defined, the term "connection" should be understood in a broad sense, and the specific meaning of the aforementioned terms in the present disclosure can be understood by those of ordinary skill in the art on a case-by-case basis.

The winding coil 10 in the prior arts or the present disclosure (the simplified illustrations for coils in the drawings are for illustrative purpose only), commonly refer to a hollow coil wound by a single wire. It includes a coil body (or main body part) 105 and a coil cavity 1035 formed within the coil body 105. The initial lead 101 at one end of the coil 10 is wound to be the innermost and bottommost layer of the coil. Then, it is wound upward along the coil in an inward-to-outward and bottom-to-top winding direction. Next, it is wound along the outer layer as the outer layer coil with an end lead (or terminal lead) 102 at its tail. The lead-out position of the initial lead wire 101 is located on the innermost side of the bottommost layer of the coil 10 and extends across its outer layers, exposed on the outermost side of the bottom side of the coil 10. In other words, the initial lead 101 forms a separate layer positioned along with the thickness direction of the coil 10 at the bottom. The lead-out position of the end lead 102 is located on the outermost coil, specifically, along with the vertical direction perpendicular to the winding direction of the coil 10 above the single layer at the bottom, that is above the lead-out position of the initial lead 101, thereby making a height difference between the initial lead 101 and the end lead 102. Herein, the hollow coil is assembled onto the device (such as a motor base), after it has been wound. However, in addition to the hollow coil, the winding coil 10 could also be applied as a on-site winding coil according to the specific requirements, for example, the winding coil 10 could be directly wound on the motor base.

In the prior art, the leads of the coil on the base are soldered to the two connection terminals set apart at the same horizontal plane inside the insulating base. However, the issue of variations in the soldering distance caused by the height difference between the initial lead 101 and the end lead 102 in the vertical direction (i.e., the thickness direction of the coil 10) of the winding coil has been neglected.

In the present disclosure, the initial lead 101 and the end lead 102 of the coil 10 are electrically connected to the respective first terminal (or soldering pin) 11b and second terminal (or soldering pin) 12b in the metal circuit 2, which are at different heights. In this embodiment, the preferred method for the electrical connection is soldering, although other contact-based electrical connection methods such as clamping or adhesive bonding could also be used. This arrangement reduces the tilt angle and extension length of the initial lead 101 and the end lead 102, effectively improving the reliability of the electrical connection between the two initial lead 101, end lead 102, and the first and second terminals 11b, 12b. It enhances signal transmission effectiveness and avoids any adverse effects on product performance and service life.

Hereinafter, the base 100 and the motor 1000 with the same of one embodiment of the present disclosure will be described in reference to FIGS. 1 to 14.

The base 100 described in the present disclosure could be applied to various types of motors, including but not limited to voice coil motors (VCM), linear motors, piezoelectric motors, or servo motors. This disclosure will be illustrated using a voice coil motor (VCM) 1000 as an example. VCM motors are essential components used in camera autofocus and image stabilization systems. Motors are widely used in smartphone cameras to achieve autofocus functionality, allowing for the adjustment of the lens position to capture clear images. The motor 1000 comprises a shell body 1001, magnetic elements 104, a lens 103, a support frame 106 that holds the lens 103, and a base 100 integrated with a coil 10 that works with the magnetic elements 104. The magnetic element 104, the lens 103 and the holder 106 carrying the lens 103 constitute the movable modules. In the present disclosure, by integrating the coil 10 into the base 100, various functions of the motor 1000 can be achieved by enabling movement in different directions through the movable module.

Referring to FIGS. 3 to 8, an embodiment of the present disclosure which related to a base 100 and a motor 1000 being widely applied in the various embodiments mentioned above, is provided. The base 100 comprising an electronic component 20 with sensing capability and a winding coil 10, is used to work with the motor 1000 to realize focusing and anti-shaking functions. The coil 10 is used to work with the magnetic element 104 to realize the focusing driving and anti-shaking functions. The base 100 comprises an insulating base (or plastic base) 1, a metal circuit 2 embedded within the insulating base 2, electronic component 20 electrically connected to the metal circuit 2, a winding coil 10 electrically connected to the metal circuit 2. The insulating base 1 comprises a plastic locating block 3 formed by one-time injection-molding and a plastic body 4 formed by a secondary injection molding on the plastic locating block 3 and the metal circuit 2.

The electronic component is a hall sensing element or an integrated circuit integrated with a hall sensing element.

Referring to FIGS. 3 to 8, the plastic body 4 plastic-injection molding, comprises a top surface 11, a bottom surface 12, four-side surface 13, a through-hole 14 through the top surface 11 and the bottom surface 12, and four corners 15. The through-hole 14 has an annular inner wall 141, between which and the four-side surface 13 there is an installation area (not shown) for setting up electronic component 20 and the coil 10. The installation area is divided into four sub-installation area (not shown) corresponding to each side of the four-side surface 13, and each sub-installation area could be used to position a corresponding coil 10 and electrically connected with the metal circuit 2.

The plastic body 4 is recessed from the top surface 11 to form a first slot (a holding section) 16, corresponding to the coil 10 in each sub-installation area. A protrusion 17 is arranged between the adjacent first slot 16 and the annular inner wall 141. On one hand, with the outer wall of the protrusion 17 corresponding to the side wall of the coil 10 interval, the stability of the winding coil could be enhanced; on the other hand, the overall strength of the plastic body 4 could be improved by the structure of protrusion 17.

The plastic body 4 is configured with at least two interval rectangular column-shaped protruding locating pillars 18 along with the length of the side surface 13 in the first slot 16, to achieve precise positioning for each coil 10. The bottom of the locating pillars 18 is fixed to the plastic body 4, and the top is chamfered with a rounded arc to facilitate the installation of the coil 10. The top surface of the locating pillars 18 is not higher than the protrusion 17 in the vertical direction. The coil cavity 1035 of the coil 10 is set on the locating pillar 18 to achieve precise positioning to the plastic body 4. In the preferred embodiment of the present disclosure, the locating pillars are specifically set as three, with two of them located at opposite ends in the winding direction of the coil 10, and the other one located in the middle of the internal area of the coil 10. The length dimension of the locating pillar 18 in the middle of the internal area is greater than the other two locating pillars 18. With the longest length for the middle locating pillar 18, the large central area of the coil 10 has been better supported, thereby enhancing the stability of the coil 10.

Figure 7:
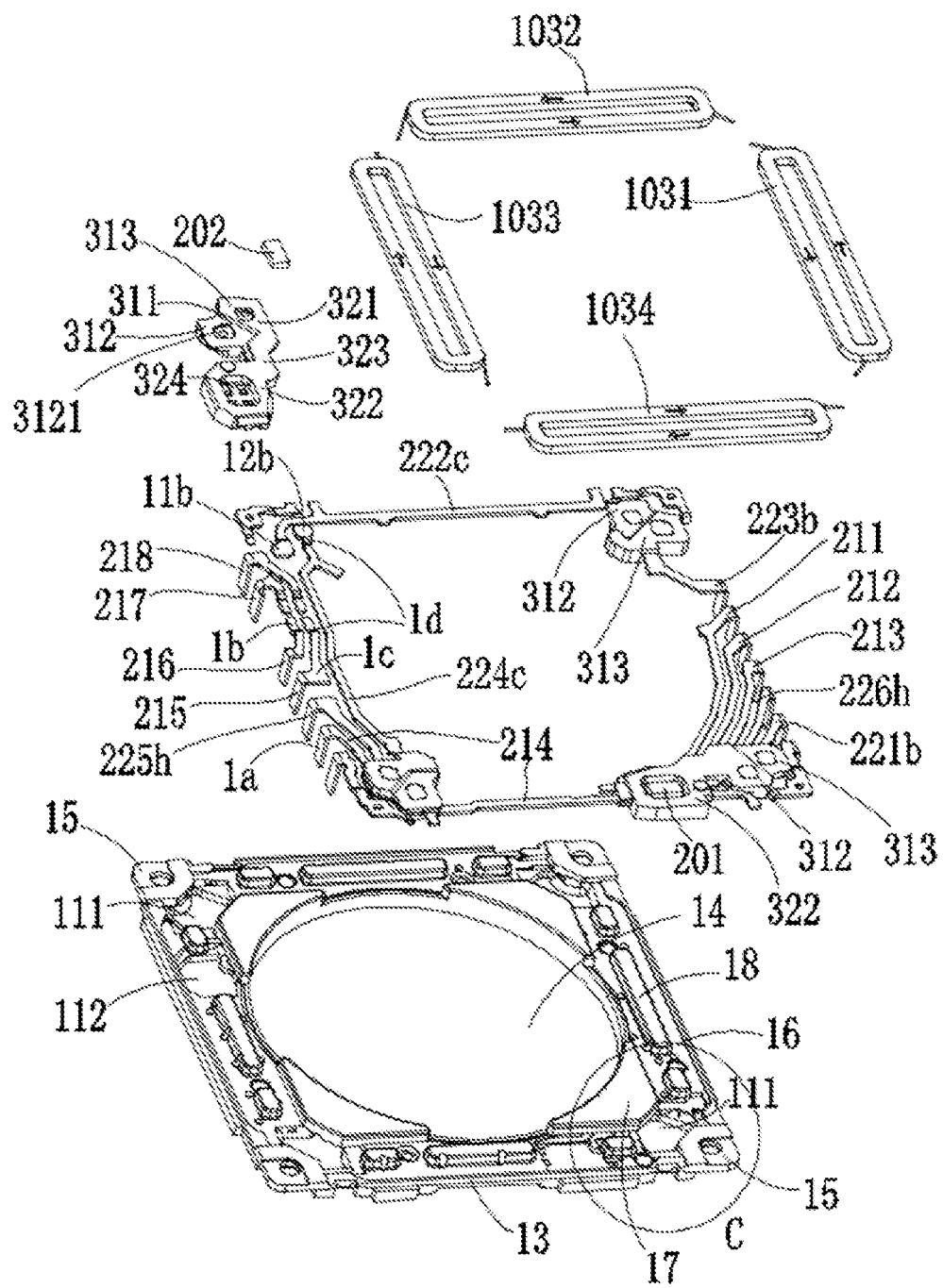
FIG. 7 is a further partial exploded perspective view of FIG. 6.
Figure 8:
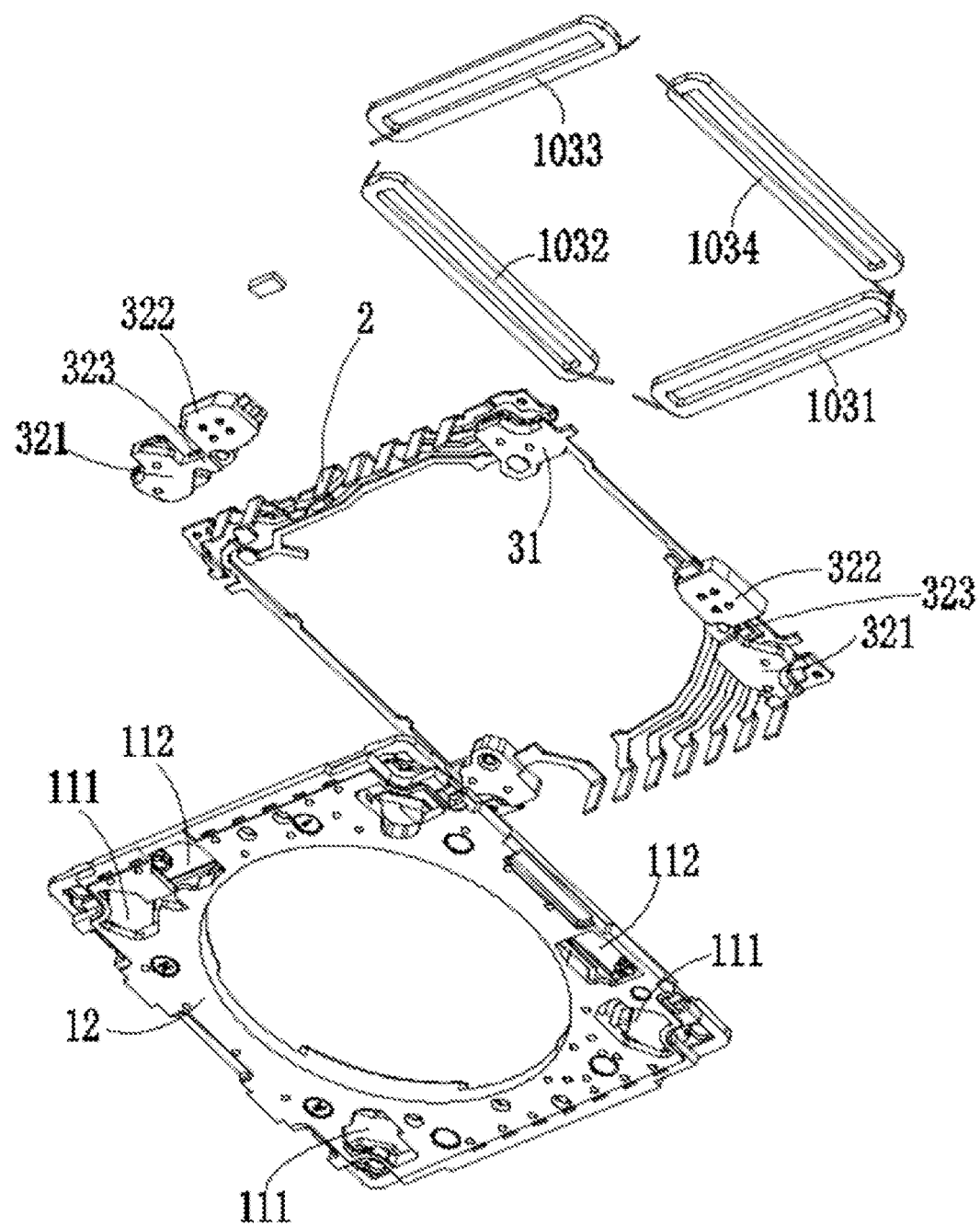
FIG. 8 is another exploded perspective view of FIG. 7.

Referring to FIGS. 7 and 8, the metal circuit 2 comprises several interval branches 21. Part of branches 21 are electrically connected to the initial lead 101 and the end lead 102 of coil 10, while another part of branches 21 are electrically connected to the soldering pins (not shown) of electronic components 20. The present embodiment, each electronic component is configured with 4 soldering pins (not shown), and electrically connected to the four branches, respectively. Each coil 10 comprising an initial lead 101 and an end lead 102, is electrically connected to the 2 branches, respectively. Furthermore, one of the initial leads 101 and one of the end leads 102 of the two coils 10 could be connected in series with a shared branch 21, thereby allowing each pair of coils 10 to be electrically connected to only three branches 21.

In a specific embodiment of the present disclosure, the base 100 is equipped with four coils, which are the first coil 1031, the second coil 1032, the third coil 1033, and the fourth coil 1034. The first coil 1031 and the third coil 1033 are arranged opposite each other within two sub-installation areas and connected in series. Similarly, the second coil 1032 and the fourth coil 1034 are arranged opposite each other within two sub-installation areas and connected in series. The electronic components comprise a first electronic component 201 and a second electronic component 202. Based on the electrical connection requirements between the coils 10, electronic components 20, and corresponding branches 21, in the preferred embodiment of the present disclosure, the base 100 is configured with at least 14 branches 21. The four of them, which are a first branch 211, a second branch 212, a third branch 213, a fourth branch 214, electrically connect to the first electronic component 201; the another four branches, which are a fifth branch 215, a sixth branch 216, a seventh branch 217, and a eighth branch 218, electrically connect to the second electronic component 202. The other six branches, which are a first coil branch 221b, a second coil branch 222c, a third coil branch 223b, a fourth coil branch 224c, a fifth coil branch 225h, and the sixth coil branch 226h, electrically connect to the four coils 10. Specifically, the first coil branch 221b and the second coil branch 222c electrically connect to the first coil 1031; the second coil branch 222c and the fifth coil branch 225h electrically connect to the third coil 1033; the third coil branch 223b and the fourth coil branch 224c electrically connect to the second coil 1032; the fourth coil branch 224c and the sixth coil branch 226h electrically connect to the fourth coil 1034. Hereinabove, the first coil 1031 and the third coil 1033 share the second coil branch 222c, the second coil 1032 and the fourth coil 1034 share the fourth coil branch 224c. Compared to the arrangement where each coil 10 electrically connects to two independent branches 21, the method of interconnecting the second coil branch 222c or the fourth coil branch 224c through a pair of coils 10 allows for a more efficient utilization of branch 21, thereby reducing the number of branches required and facilitating cost reduction and miniaturization of the base 100.

Figure 9:
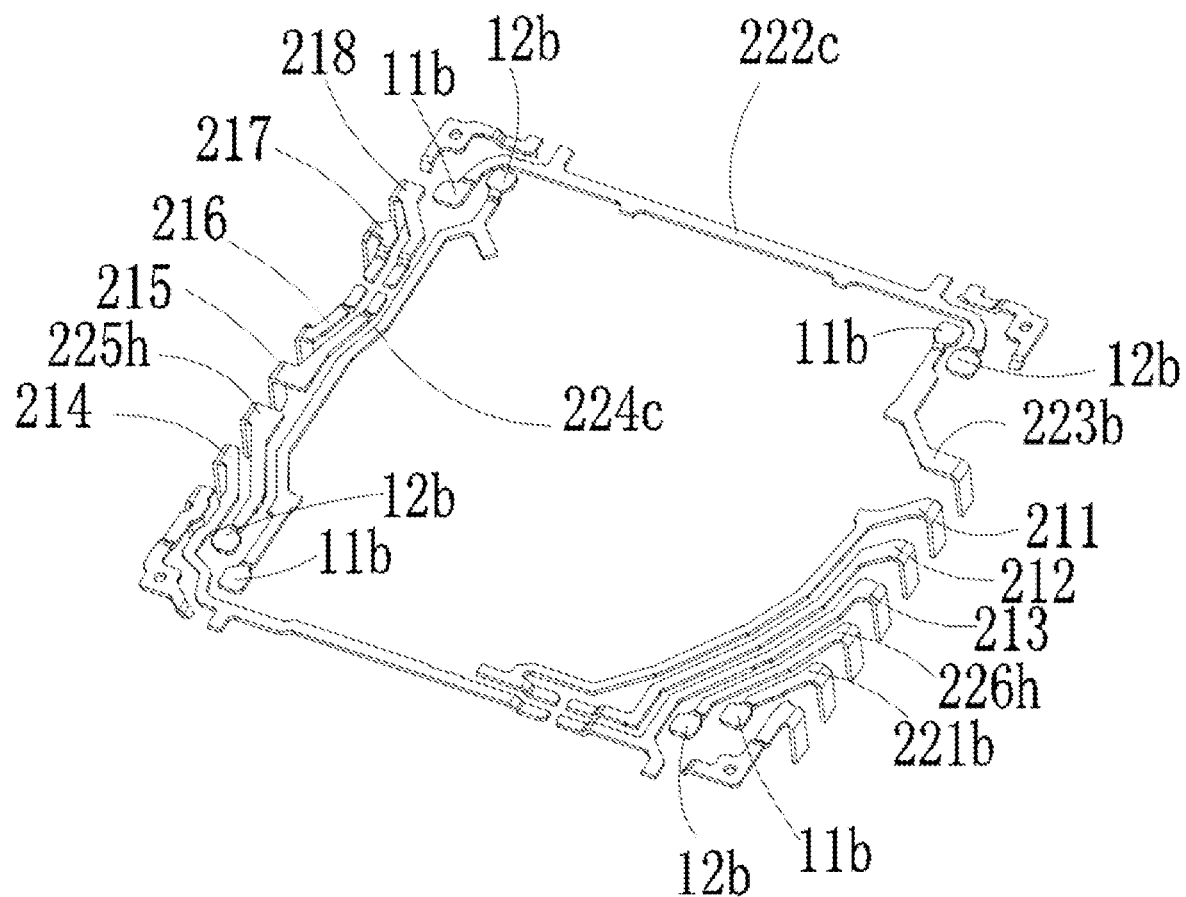
FIG. 9 is a perspective view for the mental circuit of the base with integrated coils in one embodiment of the present disclosure.

Referring to FIGS. 7 to 9, one ends of branches 21 are arranged in parallel and interval to form pins 1a exposed outside the plastic body 4 of the insulating base 1. The other ends of branches 21 are configured with connection terminals (or soldering terminals) 1b, which are molded inside the insulating base 1 and exposed on the top surface 11 of the insulating base 1 to electrically connections to the coils 10 and electronic components 20. The pins 1a of branch 21 are distributed on the opposite two side surfaces 13 of the plastic body 4 and extend in a vertical direction. There is a connection part 1c between the pins 1a of branch 21 and the connecting terminal 1b. A portion of the connection part 1c near the connection terminal 1b is bent to form a bending parts 1d, which is embedded inside the plastic body 4. The connection parts 1c are all setup in a first horizontal plane (not shown).

The plastic locating block 3 is injection-molded outside the connection terminals 1b, exposing the connection surfaces of the connection terminals 1b; the plastic body 4 comprises locating holes accommodating the plastic locating block 3, with the top surface of the plastic locating block exposed to the plastic body. The locating holes further comprise a first locating hole and a second locating hole.

The bending parts 1d of the four branches, which electrically connects to the electronic components 20, bend downward from the ends of the connection parts 1c, to make all the connection terminals 1b be in a second horizontal plane (not shown), which are lower than the first horizontal plane. Therefore, the connection surface of the electronic components 20 electrically connecting to the connecting terminals 1b could be recessed, allowing the electronic components 20 to be accommodated within the thickness region of the insulating base 1. Specifically, the electronic components in a cavity 1035 of the coil 10, are arranged interval with the coil body 105 along the thickness direction of the coil 10. To prevent the electronic components 20 from being exposed on the top surface of the first slot 16 of the plastic body 4 and being damaged during the installation of the coil 10 or other components. the connection terminals 1b of the four branches 21 electrically connecting to each electronic component 20 are arranged in parallel pairs within a rectangular region. This arrangement facilitates the electrical connection to the four connection terminals of the electronic components 20.

Figure 10:
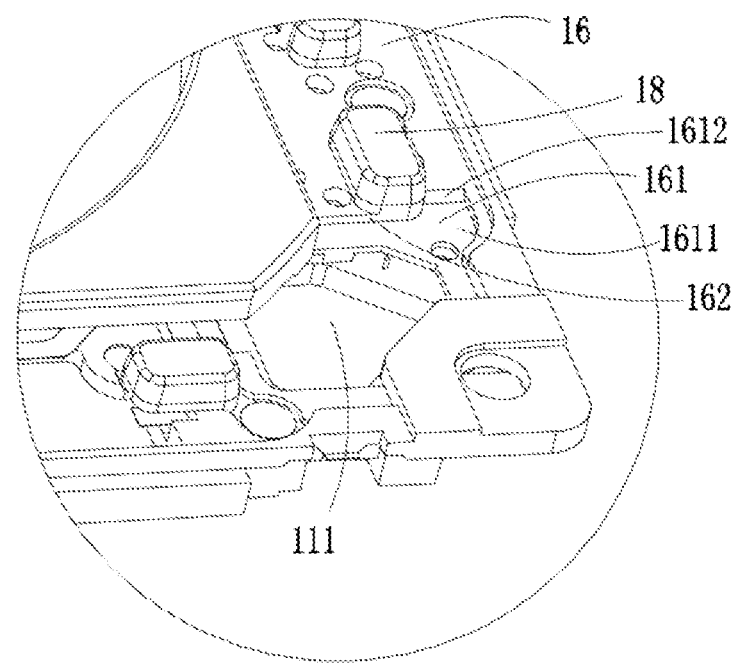
FIG. 10 is the sectional perspective magnified view for Part C of the insulating base.
Figure 11:
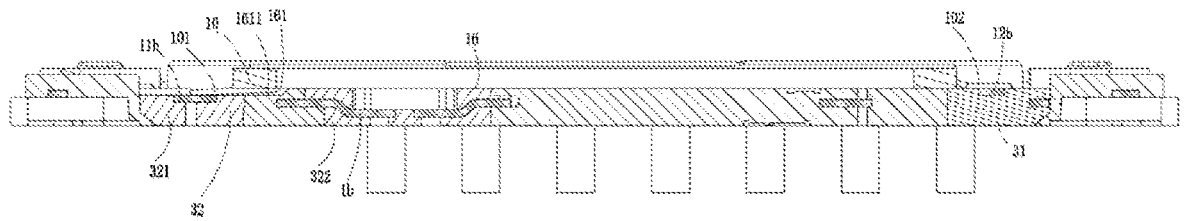
FIG. 11 is the sectional view for the base with integrated coils along with the A-A direction in FIG. 5.
Figure 12:
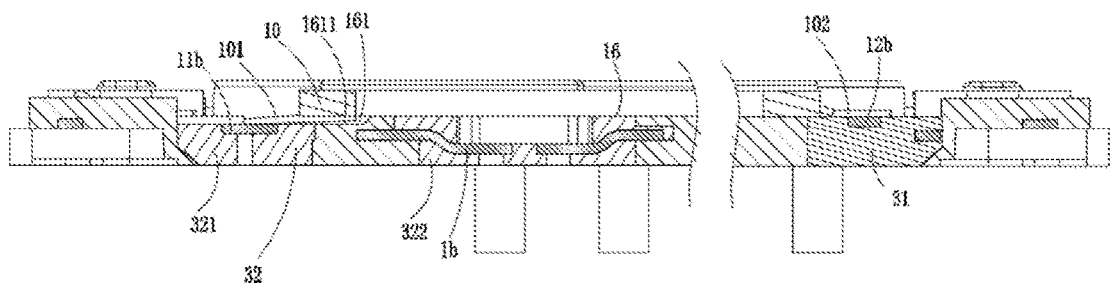
FIG. 12 is the partly blocking sectional view of FIG. 11.
Figure 13:
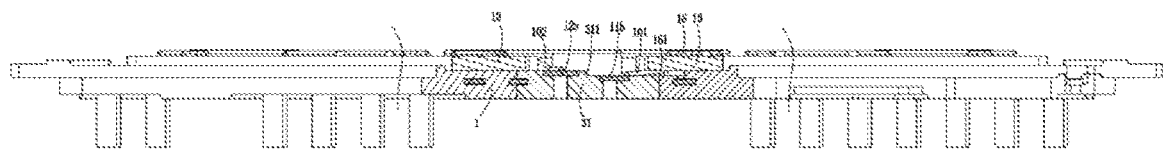
FIG. 13 is sectional view for the base with integrated coils along with the B-B direction in FIG. 5.
Figure 14:
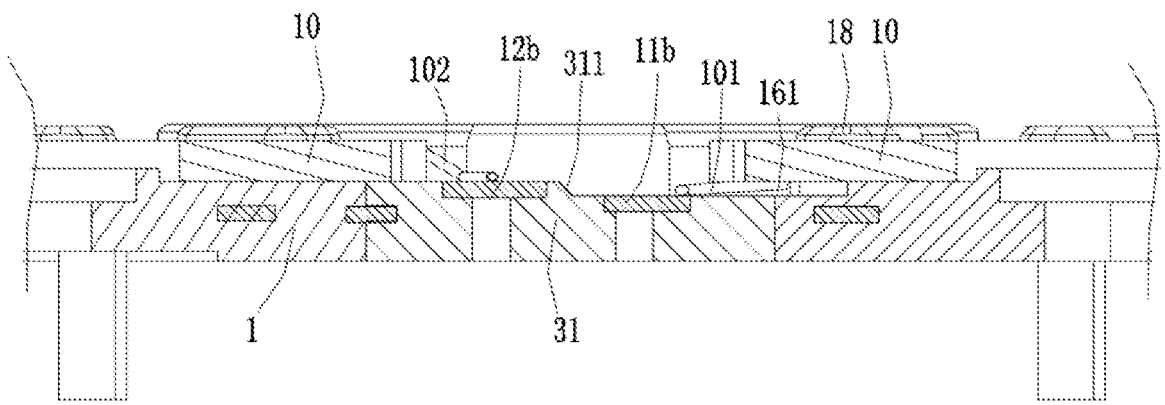
FIG. 14 is the partly blocking sectional view of FIG. 13.
Figure 15:
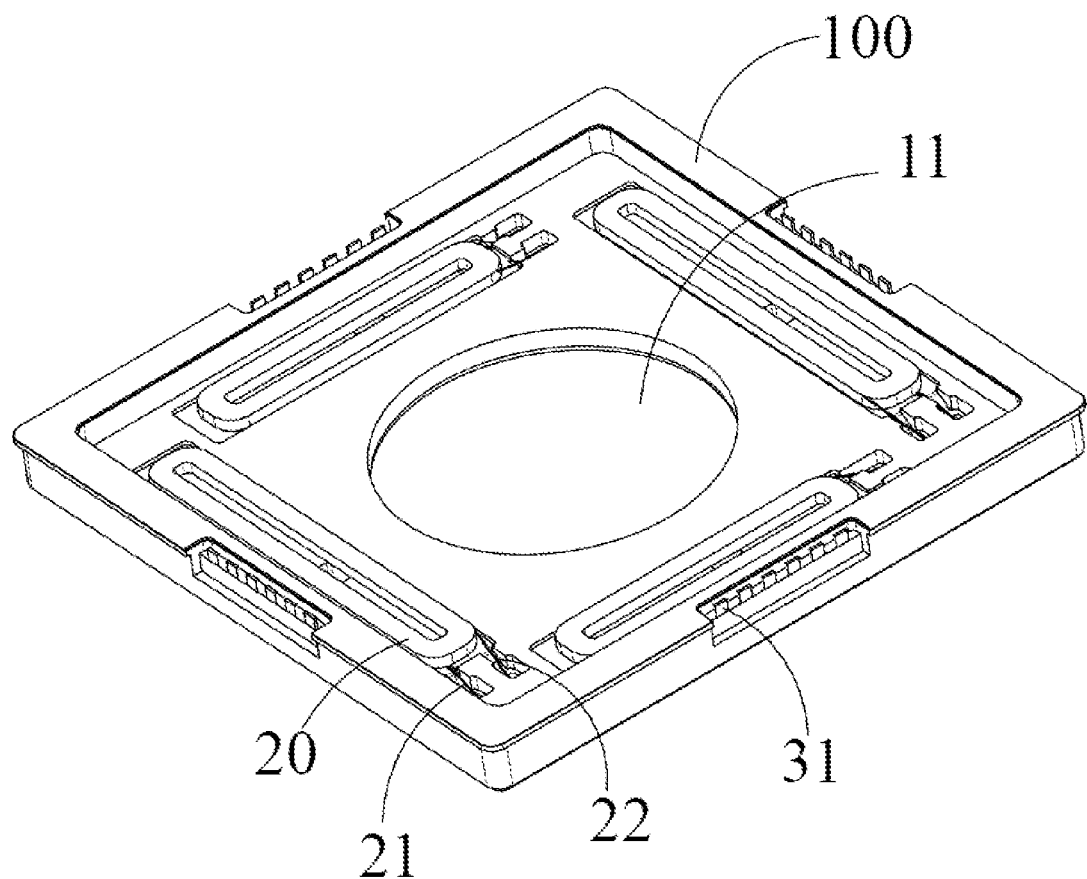
FIG. 15 is the schematic perspective view for the base with integrated coils in another embodiment of the present disclosure.
Figure 16:
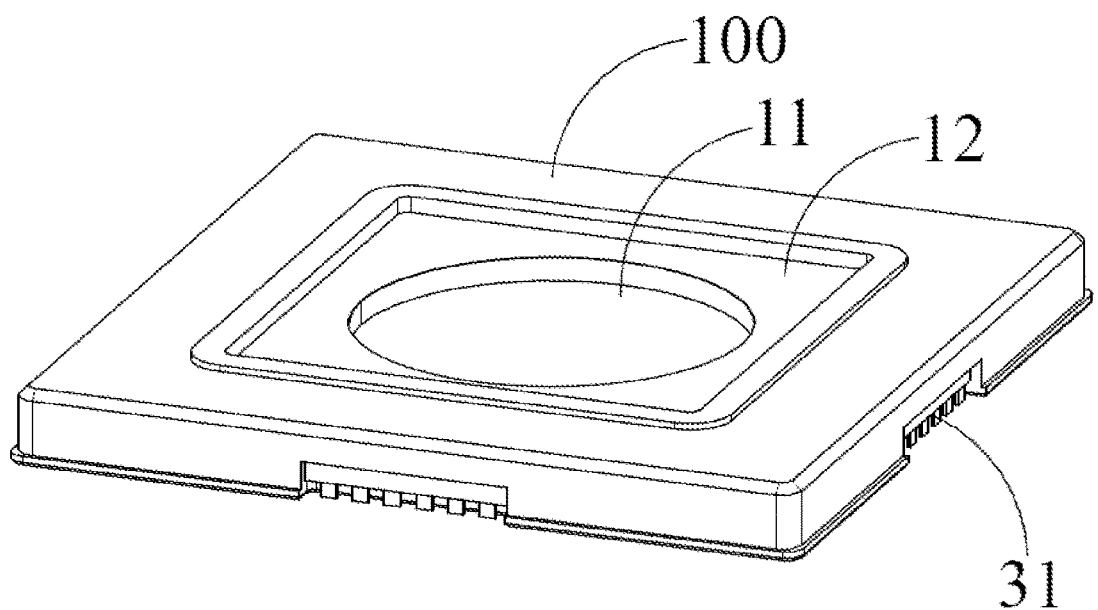
FIG. 16 is another schematic perspective view for the base with integrated coils in another embodiment of the present disclosure.

Referring to FIGS. 9 to 11, the connection parts are all setup in a first horizontal plane; the bending parts of the two branches 21, which electrically connects to the coil 10, bend upward from the ends of connection parts 1c, to make the connection terminals in higher plane than the first horizontal plane. In a preferred embodiment, the connection surface of the first terminal 11b of the connection terminals 1b that electrically connect to the initial lead 101 of the coil 10 is in a third horizontal plane; the connection surface of the second terminal 12b of the connection terminals 1b that electrically connect to the end lead 102 of the coil 10 is in a fourth horizontal plane; wherein the third horizontal plane is lower than the fourth horizontal plane in the vertical direction, however, both of them are higher than the first horizontal plane. In the present embodiment, the first coil branch 221b comprises a first terminal 11b, the second coil branch 222c comprises a second terminal 12b, and the first terminal 11b of the first coil branch 221b and the second terminal 12b of the second coil branch 222c electrically connect to the initial lead 101 and the end lead 102 of the first coil 1031, respectively. The second coil branch 222c comprises a first terminal 11b, the fifth coil branch 225h comprises a second terminal 12b, the first terminal 11b of the second coil branch 222c and the second terminal 12b of the fifth coil branch 225h electrically connect to the initial lead 101 and the end lead 102 of the third coil 1033, respectively. The third coil branch 223b comprises a first terminal 11b, the fourth coil branch 224c comprises a second terminal 12b, the first terminal 11b of the third coil branch 223b and the second terminal 12b of the fourth coil branch 224c electrically connect to the initial lead 101 and the end lead 102 of the second coil 1032, respectively. The fourth coil branch 224c comprises a first terminal 11b, the sixth coil branch 226c comprises a second terminal 12b, the first terminal 11b of the fourth coil branch 224c and the second terminal 12b of the sixth coil branch electrically connect to the initial lead 101 and the end lead 102 of the fourth coil 1034, respectively. In the present embodiment, the first terminal 11b and the second terminal 12b are flat plate-shaped structures, with their connection surfaces being in a horizontal plane shape. However, it is also possible for the first terminal 11b and the second terminal 12b to have protrusions or indentations on their surfaces, giving them a curved shape.

The connection terminals 1b corresponding to the initial lead 101 and the end lead 102 of each coil 10 are respectively arranged at the two opposite sides of the coil 10, and their connection lines is parallel to the length direction of the side surface 13. The two connection terminals 1b corresponding to the initial lead 101 of the coil 10 and the end lead 102 of the adjacent coil 10, are arranged adjacent and interval in the coil soldering area (not shown). The coil soldering area is located between the protrusion 17 and the corner 15, and located between the two sub-installation area.

Referring to FIGS. 3 to 8, and FIGS. 10 to 14, before the metal circuit 2 is injected into the plastic body 4, the plastic locating blocks 3 are pre-formed around all the connection terminals 1b through a one-time injection-molding process. This allows for precise positioning of the connection terminals 1b and facilitates subsequent electrical connections between the connection terminals 1b, the coils 10, and the electronic components 20. In this embodiment, the plastic locating blocks 3 consist of two types: the first plastic block 31 and the second plastic block 32. The first plastic block 31 is used to inject and position the first terminal 11b and the second terminal 12b of the adjacent coils 10, as well as the four connection terminals 1b of the adjacent electronic components 20 in their respective positions. The second plastic block 32 is only used to inject and position the first terminal 11b and the second terminal 12b of the adjacent coils 10.

The first plastic block 31 is configured with interval coil connection section 321. The coil connection section is configured with a first step structure to form a first connection block 312 and a second connection block 313. The first step structure 311 is setup between the first terminal 11b and the second terminal 12b, and its extension direction relative to the length direction of the side surface 13 forms a certain angle. The top surface of the first connection block 312 is lower than the top surface of the second connection block 313 in the vertical direction. The first connection block 312 and the second connection block 313 are provided with soldering slots 3121 on their top surfaces to accommodate the corresponding first connection terminal 11*b* and second connection terminal pin 12*b*. The top surfaces of the first terminal 11*b* and second connection terminal 12*b* are exposed on the top surfaces of the first connection block 312 and the second connection block 313, respectively, to achieve electrical connection with the lead wires of the coil 10. The connection surfaces of the first terminal 11*b* and the second terminal 12*b* are flush with the top surfaces of the first connection block 312 and the second connection block 313, respectively. Before soldering the first terminal 11*b*, the second terminal 12*b*, initial lead 101, and end lead 102, all of them are pre-loaded with solder material for mutual soldering and fixation. During the soldering process, the first step structure 311 is formed between the first connection block 312 and the second connection block 313, which enclose the first terminal 11*b* and the second terminal 12*b*. The first step structure 311 is used to isolate the solder material used for soldering the first terminal 11*b* and the second terminal 12*b*, thereby preventing short circuits after soldering. In other embodiments, the connection surfaces of the first terminals 11*b* and the second terminals 12*b* could be lower the corresponding first connection blocks 312 and the second connection blocks 313. Therefore, the sinking of the connection surfaces facilitates the collection of soldering materials.

The coil connection parts 321 and the electronic component connection parts 322 are configured at interval on the second plastic block 32, and the two parts are connected with connecting structures 323. The electronic component connection part 322 is recessed from the top surface of the second plastic block 32 to form an accommodating cavity 324. The four connection terminals 1*b* electrically connected to the electronic components 20, are exposed on the bottom surface of the accommodating cavity 324 to establish electrical connection with soldering pins of the electronic component 20. There is a gap (not shown) between the four walls of the electronic component 20 and the accommodating cavity 324. The electronic component 20 is lower than the accommodating cavity 324 to prevent the electronic component 20 from being exposed on the top surface of the second plastic block 32, which could result in damage to the electronic component 20 during subsequent processes. The top surface of the second connecting block 313 is flush with the top surface of the electronic component connection part 322.

Figure 3:
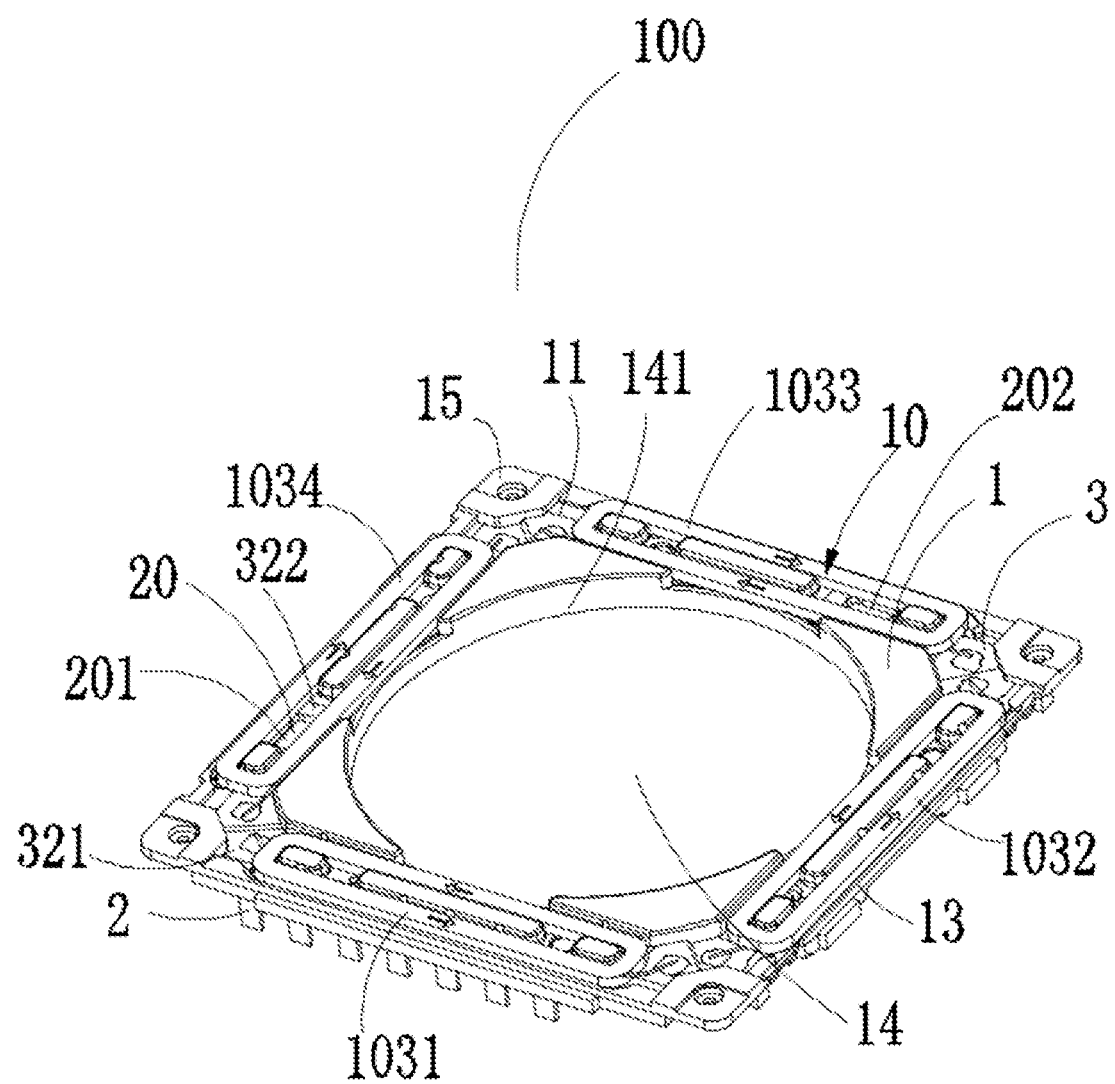
FIG. 3 is the perspective view for the base with integrated coils in one embodiment of the present disclosure.
Figure 4:
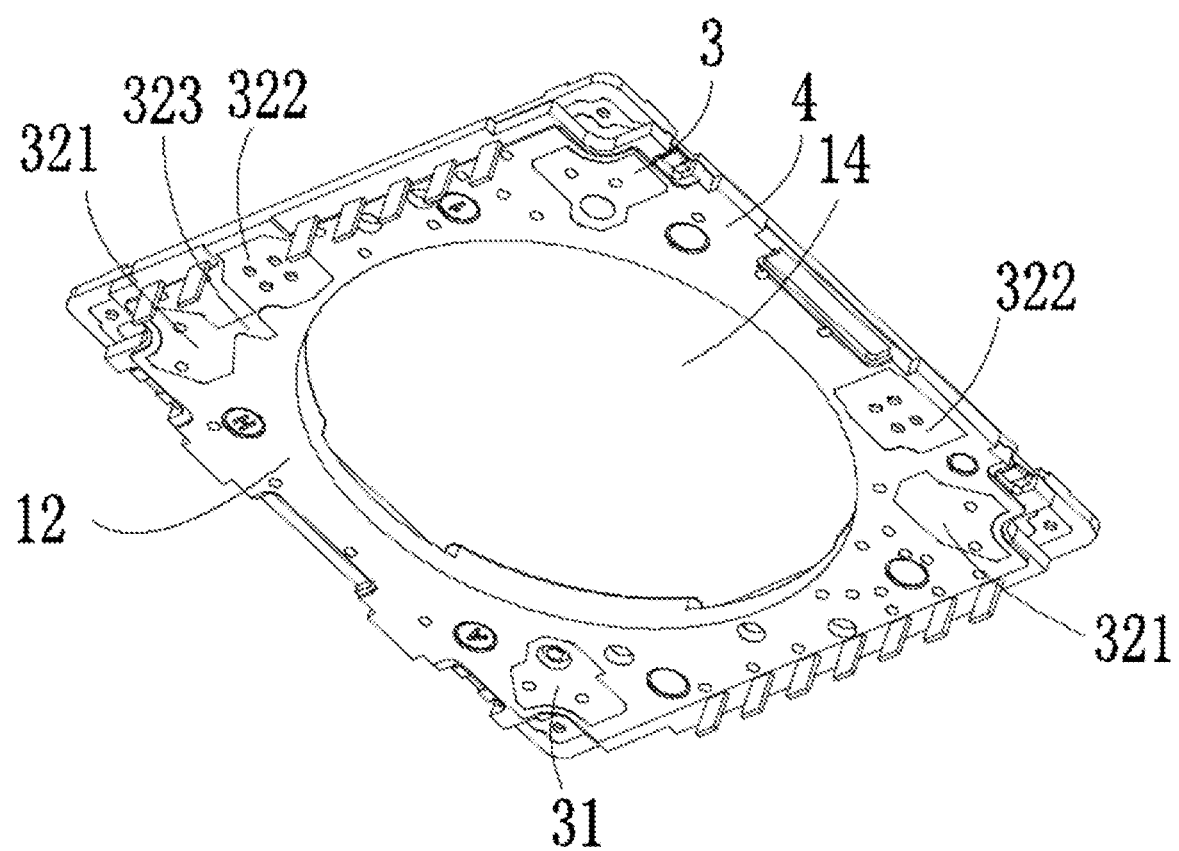
FIG. 4 is another perspective view for the base with integrated coils in one embodiment of the present disclosure.
Figure 5:
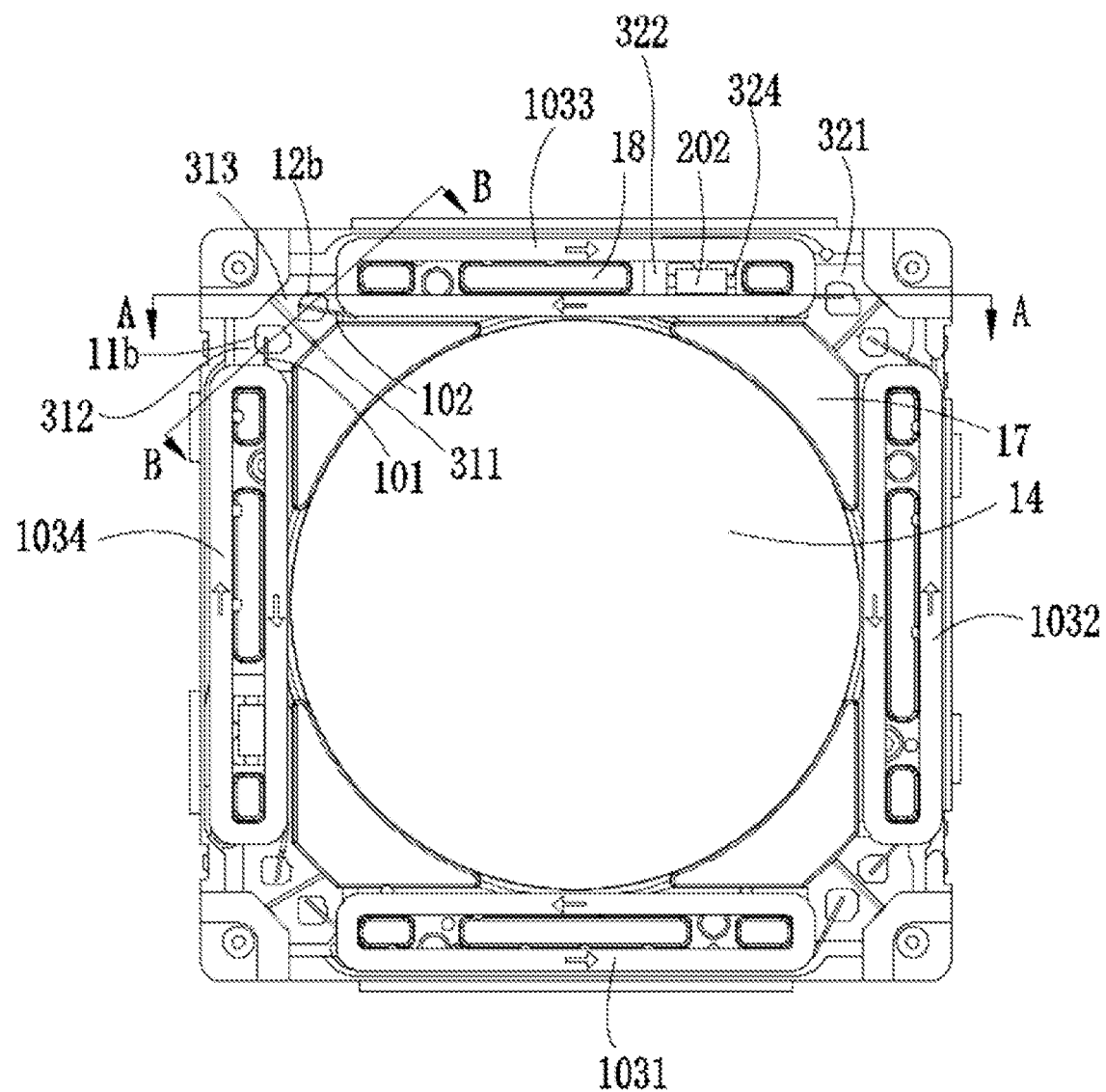
FIG. 5 is a top view for the base with integrated coils in one embodiment of the present disclosure.
Figure 6:
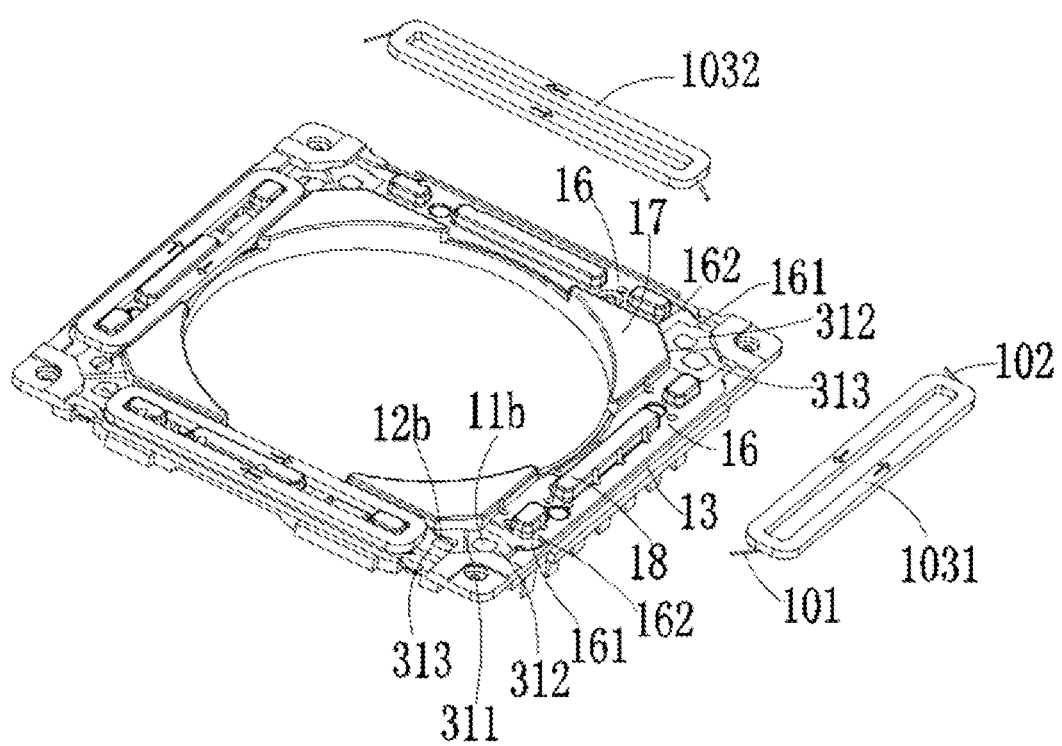
FIG. 6 is a partial exploded perspective view of FIG. 3.

Referring to FIGS. 3 and 6, the plastic body 4 is formed by a secondary injection molding process on the first plastic block 31, the second plastic block 32 and the metal circuit 2, the connection part 1*c* and the bending part 1*d* are formed inside the plastic body 4 through the injection molding process with the pins 1*a* exposing outside the plastic body 4. The plastic body 4 is configured with locating holes, which are a first locating hole 111 corresponding to the coil connection parts 321 of the two first plastic blocks 31, and a second locating hole 112 corresponding to the electronic component connection parts 322 of the second plastic blocks 32. The second connection block 313 of the first plastic block 31 and the second plastic block 32, the top surface of the electronic component connection part 322, are flush with the top surface of the plastic body 4. The coil connection part 321 of the first plastic block 31 and the second plastic block 32 is positioned in the coil soldering area of the plastic body 4. The electronic component connection part 322 of the second plastic block 32 is located on the bottom side of the coil 10, and the accommodating cavity 324 is exposed within the internal area between the two locating pillars 18 of the coil 10.

Referring to FIG. 6, FIG. 7, FIG. 10 and FIG. 14, after injection molding the plastic body 4 on the metal circuit 2 and plastic locating block 3, the coil 10 is positioned on the locating pillars 18 within the corresponding first slot 16. Meanwhile, the bottom side of the coil 10 is placed on the bottom surface of the first slot 16 of the plastic body 4, and it is securely bonded and fixed with adhesive to ensure a gapless connection. In existing technology, due to the positioning of the initial lead 101 of the coil 10, which crosses from the inner lead wire to the outer lead wire of the coil 10 and is located separately at the bottom of the coil 10, the initial lead 101 tends to lift the coil 10. The positioning of the initial lead 101 may cause the coil 10 to tilt relative to the bottom surface of the first slot 16. The tilted coil 10 could lead to unstable positioning, resulting in movement of the coil 10 after installation, which in turn affects the reliability of coil 10 installation and electrical stability. Therefore, in the present embodiment, an accommodating slot (or recessed slot) 161 is arranged between the first slot 16 and the first connection block 312 of the plastic locating block 3. A second step structure 162 is formed between the accommodating slot 161 and the first slot 16. The accommodating slot 161 includes a bottom surface 1611 and a side surface 1612 connecting to the bottom surface 1611. At least a portion of the side wall of the locating pillar 18 is located within the accommodating slot 161. The depth of the accommodating slot 161 is greater than or equal to the thickness of the initial lead 101 to ensure the initial lead 101 not protrude from the accommodating slot 161, allowing the coil 10 to steady adhere to the top surface 11 of the plastic body 4, ensuring the flatness and stability of the coil 10.

The bottom side of the coil 10 is setup inside the first slot 16 and rests against the bottom surface of the first slot 16. Due to the side surface 1612 of the accommodating slot 161 being flush with the side wall of the locating pillar 18, that is, at least a portion of the side wall of the locating pillar 18 is located within the accommodating slot 161, the innermost lead wire of the coil 10 rests against the side wall of the locating pillar 18. Therefore, the initial lead 101 is directly led out from the inner lead wire to the outer lead wire from the accommodating slot 161. It ensures the accommodating slot 161 completely contain the initial lead 101, thereby ensuring a better fit of the bottom side of the coil 10 against the bottom surface of the first slot 16. By the bottom surface 1611 of the accommodating slot 161 being flush with the top surface of the first connecting block 312, the initial lead 101 could electrically connect to the first terminal 11*b* in a same plane without bending, thereby ensuring that the initial lead 101 is less prone to breakage after electrical connection. The end lead 102 of the coil 10 directly electrically connects to the second terminal 12*b* from the top surface of the plastic locating block 3. Due to the height difference between the first terminal 11*b* and the second terminal 12*b* in the vertical direction, it could offset the height difference between the initial lead 101 and the end lead 102 of the coil 10. Thus it could reduce the electrical connection distance between the connection terminals 1*b* and the corresponding leads, ensuring that there are no stepped surfaces or bending parts between the leads and the connection terminal 1*b*, and preventing breakage of the leads after electrical connection. In other embodiments, the bottom surface 1611 of the accommodating slot 161 may extend higher along the thickness direction of the coil 10 than the top surface of the first connection block 312. It could facilitate the accumulation and collection of solder material on the top surface of the first connection block 312.

In other embodiments of the present disclosure, the first connection block 312 and the initial lead 101 can be simultaneously positioned within the same accommodating slot 161. In other words, the accommodating slot 161 serves the dual purpose of containing the initial lead 101 and accommodating the recessed first connection block 312 (which corresponds to the sinking of the first terminal 11b). In this case, the first step structure 311 and the second step structure 162 could be formed on the two opposite sides of the accommodating slot 161, respectively. In other embodiments of the present disclosure, the top surface of the first connection block 312 is not limited to being flush with the bottom surface 1611 of the accommodating slot 161. It could be lower or higher than the bottom surface 1611. Alternatively, the plastic locating block 3 could be integrally molded with the plastic body 4. In this case, the insulating base 1 could be formed in a single injection molding process to form the corresponding first connection block 312 and second connection block 313.

In the present disclosure, the first terminal 11b and the second terminal 12b of the two branches 21 that electrically connect with the coil 10 are vertically offset, which effectively enhances the electrical connection reliability of the initial lead 101 and the end lead 102 of the coil 10.

The plastic body 4 is provided with an accommodating slot 161 corresponding to the initial lead 101, which can contain the initial lead 101 and prevent coil 10 from shaking after installation on the plastic body 4. The depth of the accommodating slot 161 is greater than or equal to the thickness of the initial lead 101. Additionally, the accommodating slot 161 is connected to the outer wall of the locating pillar 18, facilitating the initial lead 101 to traverse from the innermost layer to the outermost layer of the coil.

In the present disclosure, a total of four coils 10 are configured. The first coil 1031 and the third coil 1033 are connected in series through the second coil branch 222c. Similarly, the second coil 1032 and the fourth coil 1034 are connected in series through the fourth coil branch 224c. This arrangement reduces the number of branches 21 and connection terminals 1b, thereby saving the arrangement space for the branches 21 inside the base.

In the present disclosure, prior to the injection molding of the plastic body 4, the plastic locating blocks 3 are pre-injection molded on the connection terminals 1b. The plastic locating blocks 3 accurately position the connection terminals 1b, thereby avoiding positioning errors. During the soldering process, the first step structure 311 is formed between the first connection block 312 and the second connection block 313, which encloses the first terminal 11b and the second terminal 12b. The first step structure 311 isolates the solder materials used for the first terminals 11b and the second terminals 12b, thereby preventing short circuits after the soldering process.

The plastic body 4 of the insulating base 1 in this disclosure is configured with locating pillars 18 to locate the coil 10. The locating pillars 18 are located inside the coil 10, with three locating pillars 18 being provided in each coil 10. The electronic component 20 is positioned between two locating pillars 18. This arrangement helps to optimize the layout space for both the coil 10 and the electronic component 20. Additionally, the plastic locating block 3 is designed with an accommodating cavity 324 to accommodate the electronic component 20. The depth of the accommodating cavity 324 is greater than the thickness of the electronic component 20, which prevents any contact between the coil 10 and the electronic component 20 during installation.

In this embodiment, the coil 10 is horizontally positioned within the first slot 16 on the top surface 11 of the plastic body 4. The first terminal 11b and the second terminal 12b are horizontally exposed on the plastic locating block 3 of the insulating base 1 to establish an electrical connection with the coil 10. In other embodiments, the position and arrangement of the coil 10 may vary. For example, the coil 10 and the plastic locating block 3 could be vertically arranged in a vertical plane, and the first terminal 11b and the second terminal 12b can be vertically exposed on the plastic locating block 3 to establish an electrical connection with the coil 10. Relevant technologies can be referred to Chinese patents of CN112994400B and CN112821712B, etc.

In another embodiment of the present disclosure, a base with integrated coils is provided. It is applied in the camera module of electronic devices such as mobile phones, tablets, and other consumer electronic devices. The base with integrated coils could be a voice coil motor base, etc.

Hereinafter, the base with integrated coils of another embodiment of the present disclosure is described according to FIGS. 15 to 26.

As shown in FIGS. 15 to 18, the base with integrated coil in this embodiment includes an insulating base 100 and at least one coil 200 set on the insulating base 100. The insulating base 100 is box-shaped, specifically rectangular or square. The insulating base 100 is configured with a light transmission through-holes 11 penetrating the upper and lower surfaces. The coil 200 is located on the upper surface of the insulating base 100. The lower surface of the insulating base 100 is recessed towards the upper surface to creating an installation part 12 for mounting a filter (not shown). In a preferred embodiment, the number of coils 200 could be four, and these four coils 200 are arranged around the insulating base 100. The coils 200 have initial leads 21, end leads 22, and coil bodies 20 connecting the initial leads 21 and end leads 22. Please refer to both FIG. 22 and FIG. 23. The insulating base 100 is provided with accommodating slots 10 for accommodating the initial leads 21. The accommodating slots 10 extend from the position where the coil body 20 starts winding. As a result, the initial leads 21 are housed in the accommodating slots 10, allowing the coil body 20 to be smoothly positioned on the insulating base 100 without causing instability issues with the coils 200. To facilitate the extraction of the initial lead 21, the accommodating slot 10 could be either a straight slot or a curved slot. Furthermore, to ensure that the cross-section of the initial lead 21 is fully accommodated within the accommodating slot 10, the width of the accommodating slot 10 along the direction perpendicular to the extension is greater than the width of the initial lead 21, and the height of the accommodating slot 10 is equal to or greater than the height of the initial lead 21.

The coil 200 could be a hollow coil or a on-site winding coil. The hollow coil is a pre-wound coil made of enameled wire and directly installed on the insulating base 100. The on-site winding coil is made by directly winding a certain length of enameled wire on the insulating base 100 according to actual requirements. The insulating base 100 may also have winding posts (not shown) protruding from the insulating base 100. These winding posts serve to position the coil 200 or to ensure the orderly arrangement of the winding. The coil body 20 consists of multiple layers of winding, from the bottom layer to the top layer. Each layer of winding may consist of multiple turns of wire, from the innermost to the outermost. The initial lead 21 extends outward from the innermost layer of the coil body 20 and is located below the bottom layer of the coil body 20. The end lead 22 extends outward from the outermost layer of the coil body 20 and extends outward from both ends of the coil body 20 in the longitudinal direction or from both sides in the width direction, along with the initial lead 21.

Figure 19:
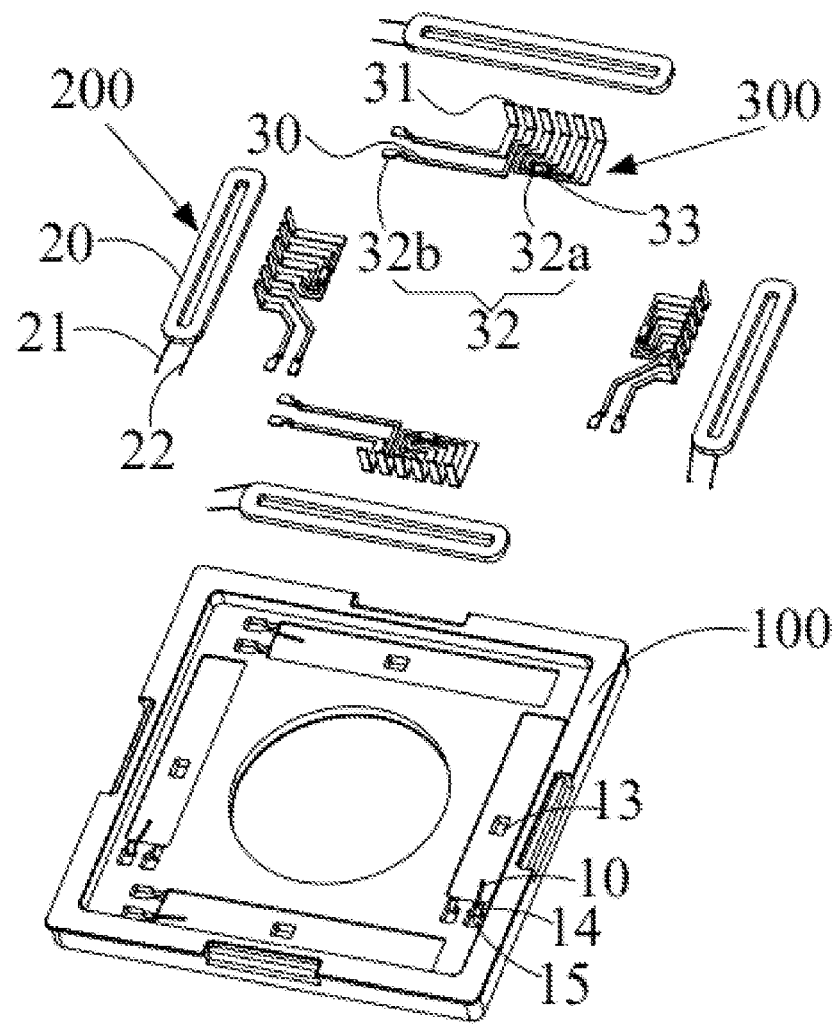
FIG. 19 is a schematic diagram of the insulating base, the coil and the mental circuit in the base with integrated coils in another embodiment of the present disclosure.
Figure 20:
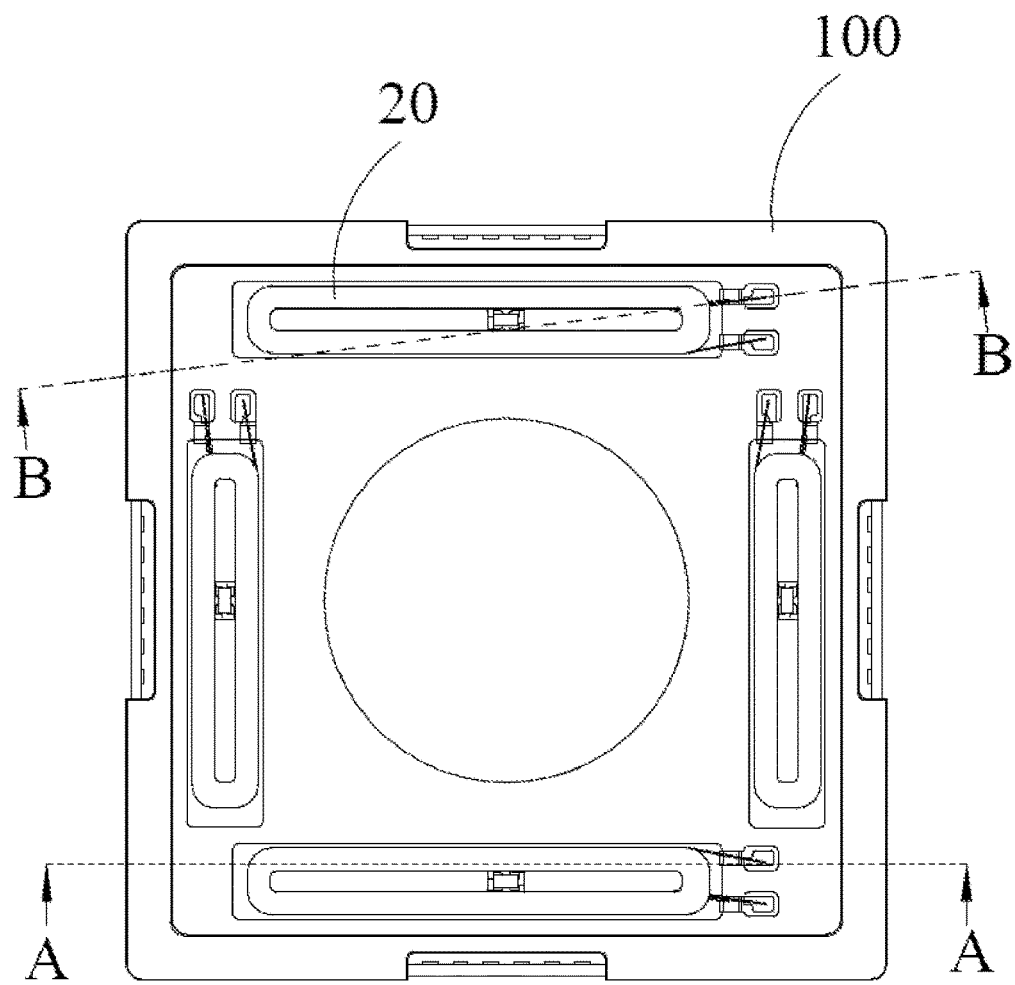
FIG. 20 is the bottom view of the base with integrated coils in another embodiment of the present disclosure.
Figure 21:
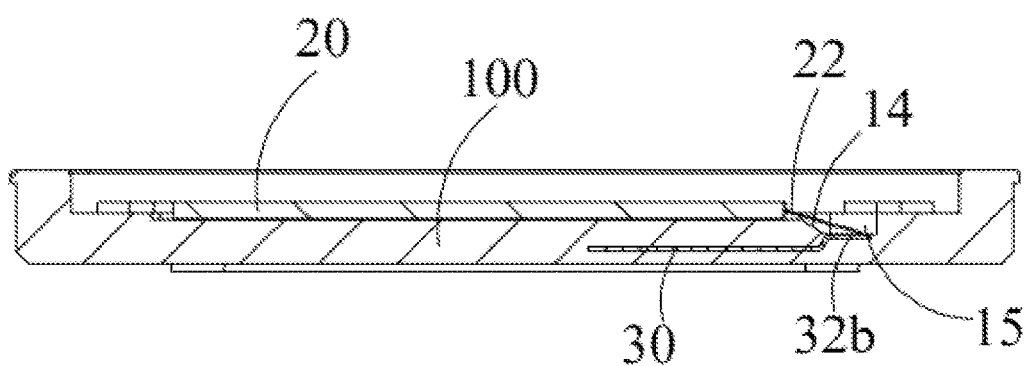
FIG. 21 is the sectional view of the FIG. 20 along with the A-A direction in one embodiment.
Figure 22:
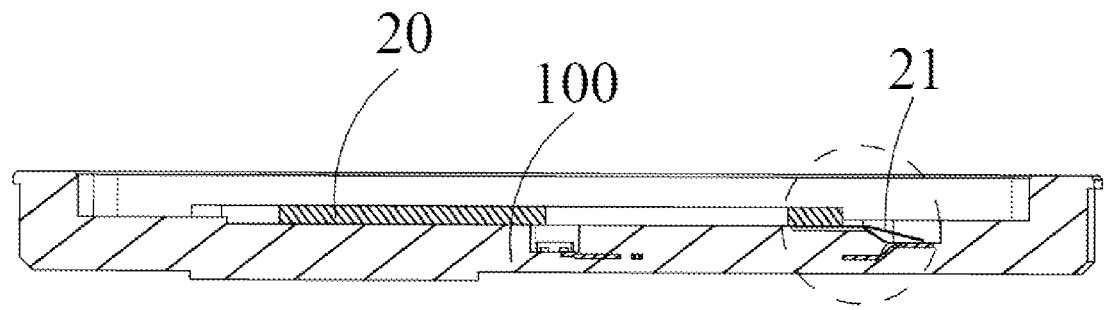
FIG. 22 is the sectional view of the FIG. 20 along with the B-B direction in one embodiment.
Figure 23:
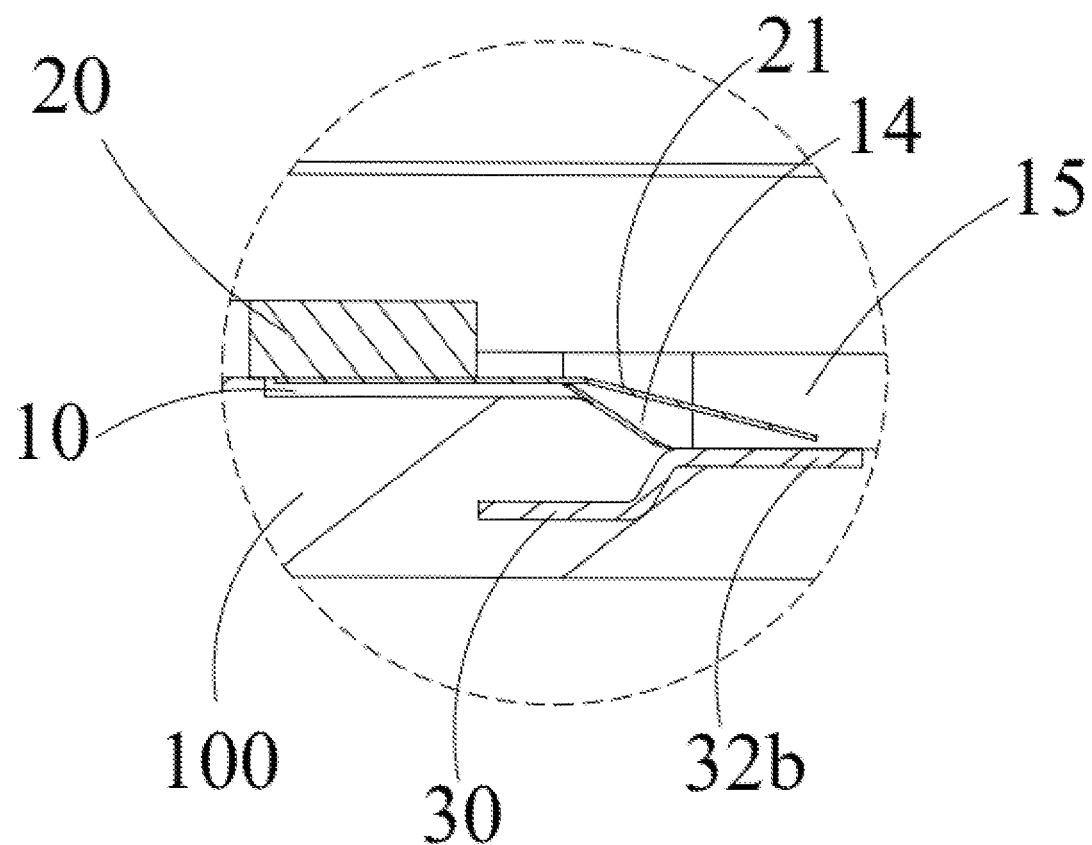
FIG. 23 is the sectional magnified view of the FIG. 22.

Referring to FIG. 19, the base with integrated coils further comprises a metal circuit 300, which is located on the insulating base 100. The metal circuit 300 comprises multiple branches 30. Each branch 30 has pin terminals 31 exposed outside the insulating base 100 and connection terminals 32. The initial lead 21 and the end lead 22 are connected to at least some of the connection terminals 32. To clearly describe the connection terminals 32 in the base with integrated coils as shown in FIG. 19, the connection terminals 32 that are connected to the initial lead 21 and the end lead 22 are defined as connection terminals 32b, while the remaining connection terminals 32 are defined as connection terminals 32a. The initial lead 21 and the end lead 22 are connected to the connection terminals 32b to pass current in the coil 200 to generate driving torque, and to work with a magnet to produce a magnetic field around the coil 200. The base with integrated coils further comprises electronic components 33, which are set on the insulating base 100. The electronic components 33 are connected to the other portion of the connection terminals 32a. The electronic components 33 could be employed as a Hall Effect Sensor or an integrated circuit (IC) with a Hall Effect Sensor. They are used to measure the magnetic flux in the magnetic field, allowing further control of the current in the coil 200. It enables more precise movement of the lens in the camera module where the base with integrated coils is applied. The insulating base 100 is configured with a holding slot 13 for accommodating the electronic components 33. The connection terminals 32a connected to the electronic components 33, are exposed within the holding slot 13. The coil bodies 20 surrounds the holding slot 13.

Figure 17:
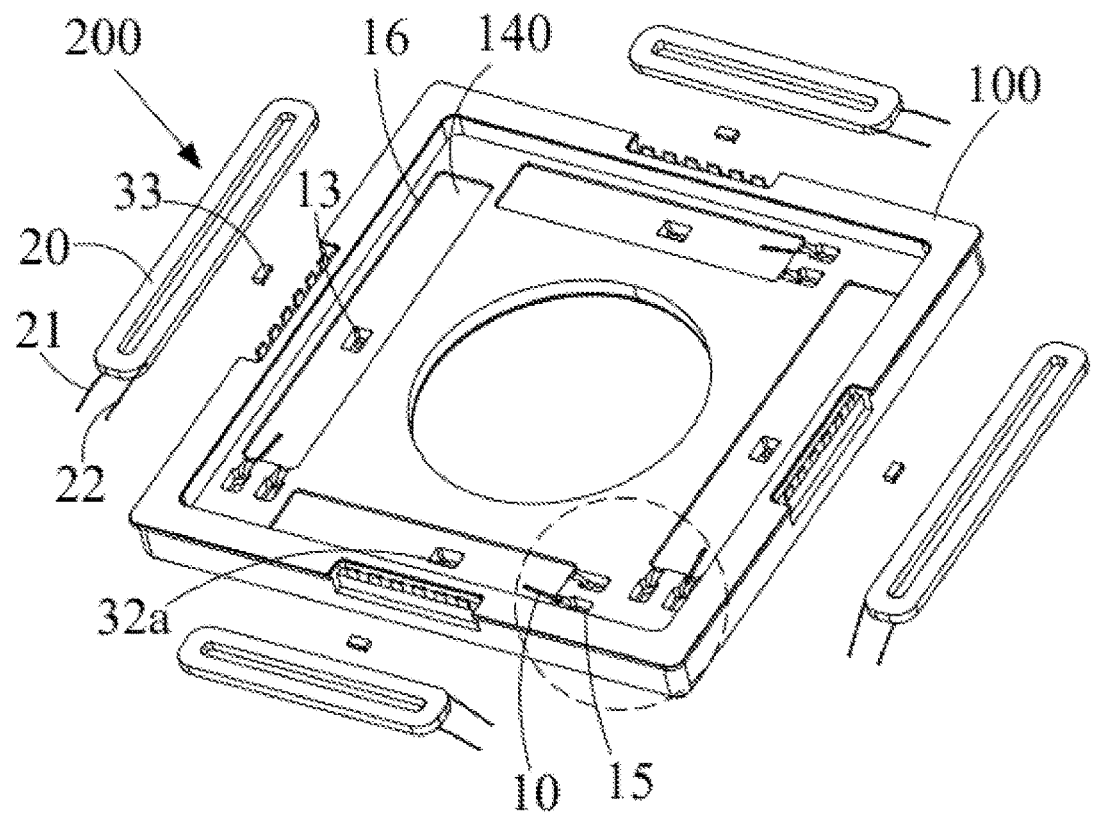
FIG. 17 is a schematic diagram of the insulating base and the coil in the base with integrated coils in another embodiment of the present disclosure.

As shown in FIG. 17, the insulating base 100 is configured with a first slot 16 for supporting the coil 200. The insulating base 100 further comprises an accommodating section 15 for accommodating the connection terminal 32b, which is connected to the initial lead 21 and the end lead 22. The accommodating section 15 is located corresponding to the position of the connection terminal 32b and is positioned at the end and/or side of the first slot 16. The accommodating slot 10 extends towards the accommodating section 15 corresponding to the initial lead 21. Specifically, the first slot 16 is a recessed slot in the insulating base 100, and the accommodating slot 10 is formed by further recessing the bottom wall 140 of the first slot 16. The accommodating section 15 is a recessed groove in the insulating base 100, and the depth of it is greater than that of the first slot 16. Through this arrangement, it facilitates the use of solder, conductive adhesive, or other electrically conductive materials to establish electrical connections between the initial lead 21, the end lead 22, and the connection terminal 32b.

There is a height difference between the first slot 16 and the connection terminal 32b. When the initial lead 21 and the end lead 22 extending from the coil body 20 are connected to the connection terminal 32b, there is a risk of the initial lead 21 and the end lead 22 being tightly bent and breaking, which prevents the coil 200 from being tightly connected to the metal circuit 300.

Therefore, as shown in FIGS. 18 to 23, a lead slot 14 is setup between the first slot 16 and the accommodating section 15. The lead slot 14 provides additional support for the initial lead 21 and the end lead 22. Compared to a design without the lead slot 14, a smaller force is required to press the initial lead 21 and the end lead 22 onto the connection terminal 32b. It prevents the initial lead 21 and the end lead 22 from being tightly bent due to excessive force, thereby avoiding breakage caused by the height difference between the first slot 16 and the connection terminal 32b. Moreover, the accommodating slot 10 extends to the lead slot 14 corresponding to the initial lead 21 and connects to the lead slot 14. The groove presented by the accommodating section 15 is also connected to the lead slot 14. The initial lead 21 passes through the corresponding accommodating slot 10, then to the lead slot 14, and then to the groove. The end lead 22 passes through the corresponding lead slot 14 to the groove.

Figure 18:
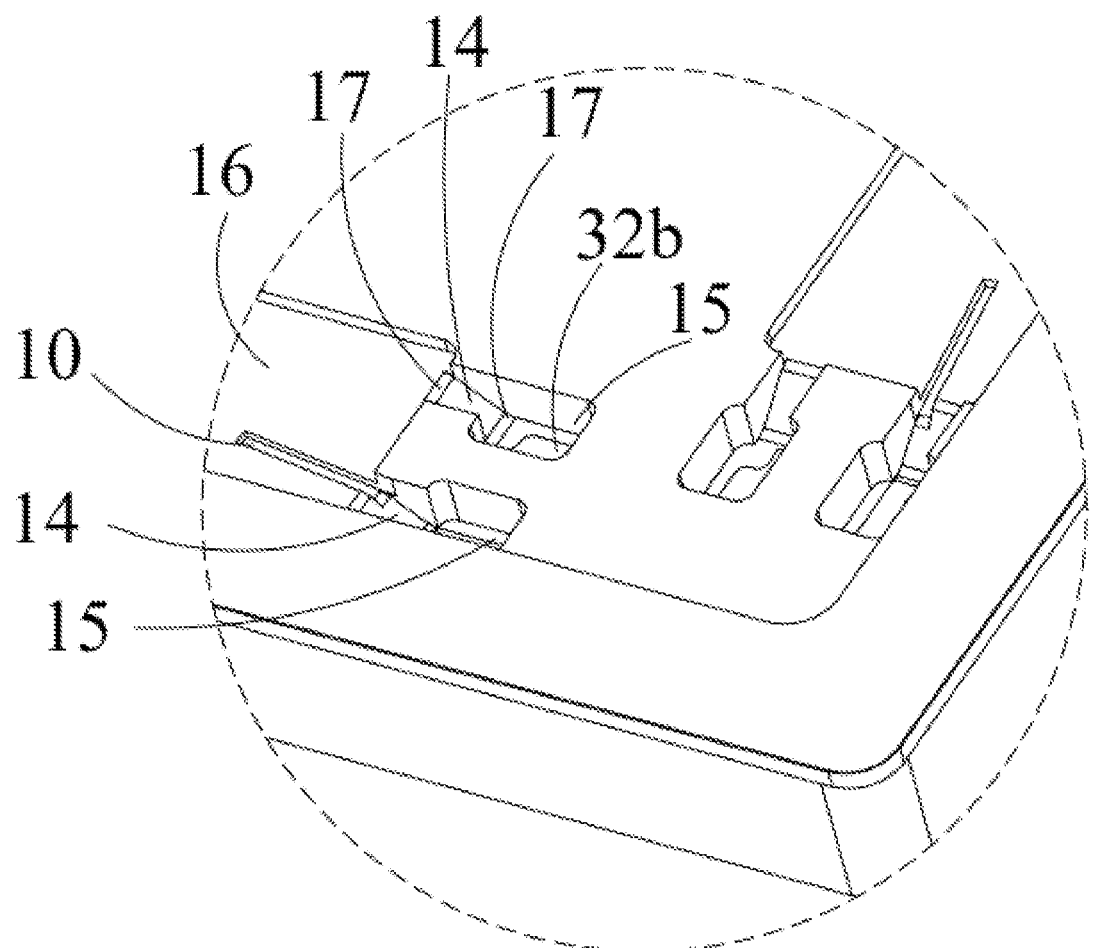
FIG. 18 is the sectional magnified view of FIG. 17.

Specifically, as shown in FIG. 18, the lead slot 14 extends at a certain angle along the first slot 16 to the holding section 15, wherein the certain angle refers to the angle at which the lead slot 14 being inclined to the first slot 16 to form a tilted shape. Certainly, a chamfer could be configured at the connecting part between the lead slot 14 and accommodating slot 10, or the first slot 16. Additionally, a chamfer could also be configured at the connecting part between the lead slot 14 and the accommodating section 15. The chamfer 17 could be either a straight chamfer or a curved chamfer. Through this arrangement, it not only allows for a smooth transition of the lead slot 14 between the first slot 16 and the accommodating section 15 but also provides a cushioned bending for the initial lead 21 and the end lead 22 at the chamfer 17, thereby avoiding potential issues of easy breakage. Alternatively, in another embodiment, the lead slot 14 extends arcuately along the first slot 16 to the accommodating section 15. Herein, the term "extends arcuately" refers to that the initial lead 21 and the end lead 22 extend to the accommodating section 15 along the lead slot 14 which is arcuate.

Figure 24:
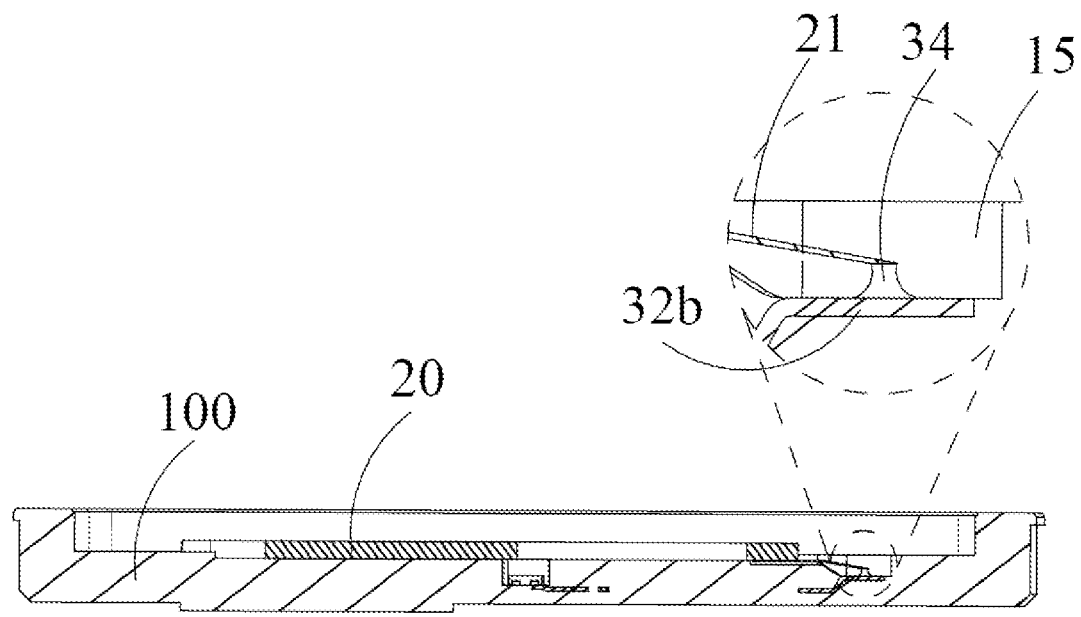
FIG. 24 is the sectional view of the FIG. 20 along with the B-B direction in another embodiment.
Figure 25:
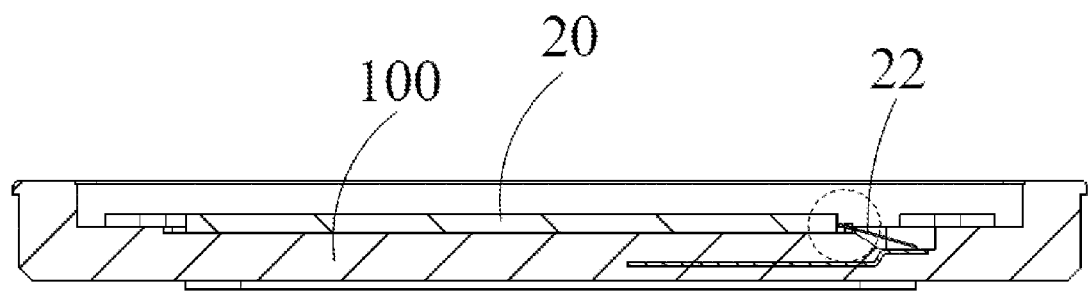
FIG. 25 is the sectional view of the FIG. 20 along with the A-A direction in a third embodiment.
Figure 26:
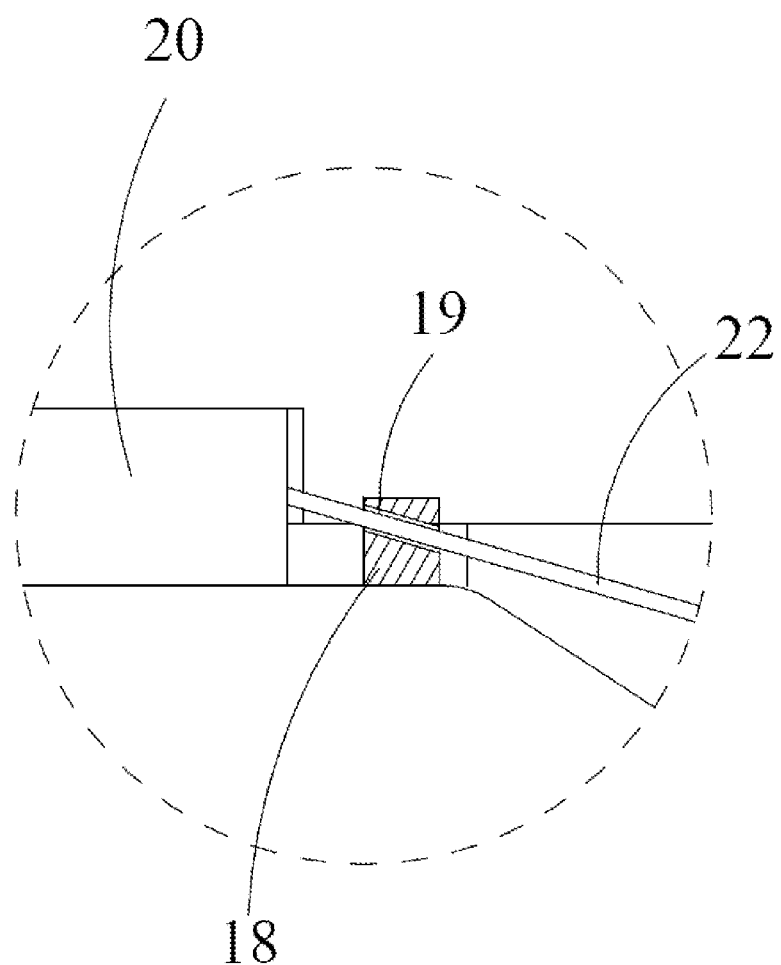
FIG. 26 is the sectional magnified view of the FIG. 25.

Referring to FIG. 24, in an alternative embodiment, the initial lead 21 and the end lead 22 connect to the connection terminal 32b through soldering. Specifically, a solder layer is configured at the connecting part of the connection terminals 32b corresponding to the initial lead 21 and the end lead 22. Furthermore, the connection terminals 32b, the initial lead 21 and the end lead 22 are pre-loaded with solder layers 34. The initial lead 21 and the end lead 22 are tightly connected to the connection terminals 32b by heating through the reflow soldering furnace. An adhesive layer is added to groove presented by the accommodating section 15 to fix the initial lead 21 and the end lead 22, preventing their movement. That is, the adhesive layer is formed by injecting adhesive materials to the accommodating section 15, after the initial lead 21 and the end lead 22 are soldered to their corresponding connection terminals 32b.

Since the end lead 22 extends from the top layer of the coil body 20, the end lead 22 will have a relatively long section hanging in a suspended state. Please refer to FIGS. 25 and 26 of another embodiment, in order to position and support the end lead 22, the insulating base 100 corresponding to the position of the end lead 22 is configured with an upwardly protruding protrusion part 18. And the protrusion part is recessed to form a positioning slot 19, where the end lead 22 is placed and passes through, thereby preventing the end lead 22 from loosening or falling from the outermost layer of the coil 200.

In summary, the provided base with integrated coils is configured with accommodating slots 161 and 10 for initial leads 21, which extend from the position where the coil bodies 105 and 20 start winding. Through this arrangement, even if the initial lead 21 is placed at the bottom of the coil bodies 105 and 20, it will not affect the stability of the coil bodies 105 and 20. Thus the coil bodies 105 and 20 will not easily shake.

Finally, it should be noted that the above embodiments are only intended to illustrate the technical solution of the present disclosure, and not to limit it. Although detailed descriptions have been provided in reference to the aforementioned embodiments, those skilled in the art should understand that modifications can still be made to the technical solutions described in the embodiments, or equivalent substitutions can be made to some or all of the technical features. Such modifications or substitutions do not depart from the scope of the technical solutions provided in the embodiments of the present application.

The above description only represents partial embodiments of the present application, not all embodiments. Any equivalent variations or modifications made by those skilled in the art based on the present disclosure are considered to be within the scope of the claims of the present disclosure.

What is claimed is:

1. A base with integrated coils, comprising:
   a coil, includes an initial lead, an end lead, and a coil body connecting the initial lead and the end lead;
   an insulating base, configured with an accommodating slot for the initial lead, which extends from the position where the coil body starts winding;
   a metal circuit, embedded within the insulating base and electrically connected to the coil;
   wherein the coil is fixed onto the insulating base and electrically connected to the metal circuit; the width of the accommodating slot along with a direction perpendicular to the extension direction is greater than the width of the initial lead; and the height of the accommodating slot is greater than or equal to the height of the initial lead;
   the initial lead extends outward from the innermost layer of the coil body, passes through the outermost layer, and is disposed at the bottom of the coil body as a single layer;
   the lead-out position of the end lead is higher than the lead-out position of the initial lead in the thickness direction of the coil; the metal circuit comprises several branches, and each of the branches includes connection terminals positioned on the insulating base; the connection terminals include a first terminal electrically connected to the initial lead and a second terminal electrically connected to the end lead.

2. A base with integrated coils of claim 1, wherein the initial lead and the end lead are respectively positioned on two opposite sides of the coil, and the first terminal and the second terminal are exposed on two opposite sides of the insulating base of the coil.

3. A base with integrated coils of claim 1, wherein the width of the accommodating slot along with a direction perpendicular to the extension direction is greater than the width of the initial lead; and the height of the accommodating slot is greater than or equal to the height of the initial lead.

4. A base with integrated coils of claim 1, wherein the insulating base is configured with at least two interval protruding locating pillars, and the coil is a wound hollow coil that is positioned outside the at least two locating pillars; the at least two locating pillars are positioned on two opposite ends of the coil, and at least a portion of the locating pillar closest to the initial lead is located within the accommodating slot.

5. A base with integrated coils of claim 3, wherein the insulating base comprises a plastic locating block formed by one-time injection-molding and a plastic body formed by a secondary injection molding on the plastic locating block and the metal circuit; the plastic locating block is injection-molded outside the connection terminals, exposing the connection surfaces of the connection terminals; the plastic body forms a locating hole accommodating the plastic locating block, with the top surface of the plastic locating block exposed to the plastic body.

6. A base with integrated coils of claim 5, further comprising: at least two coils set apart, wherein the end lead and initial lead of the adjacent coils set near each other, share a single plastic locating block with the second terminal and first terminal respectively corresponding to the end lead and initial lead.

7. A base with integrated coils of claim 6, wherein the plastic locating block comprises a coil connection section, wherein the coil connection section includes a first connection block, a second connection block, and a first step structure formed between the first connection block and the second connection block; the first connection block is lower than the second connection block in the thickness direction of the coil; the connection surface of the first terminal is exposed on the first connection block, and the connection surface of the second terminal is exposed on the second connection block; the bottom surface of the accommodating slot is higher than or equal to the top surface of the first connection block in the thickness direction of the coil.

8. A base with integrated coils of claim 7, wherein the insulating base is configured with a first slot for accommodating each of the coils, with the bottom surface of the coil resting against the bottom surface of the first slot; a second step structure is formed between the bottom surfaces of the accommodating slot and the first slot, and the top surface of the second connection block is same height with the bottom surface of the first slot.

9. A base with integrated coils of claim 8, wherein at least two of the coils comprises a first coil and a third coil, which are arranged opposite to each other and connected in series; the branches comprise at least a first coil branch, a second coil branch and a fifth coil branch; the first coil branch and the fifth coil branch both include pins exposed outside the insulating base; the second coil branch includes a pin on one side and a first terminal on the other side; the second coil branch includes a second terminal on one side and a first terminal on the other side; the fifth coil branch includes a pin on one side and a second terminal on the other side; the initial lead and the end lead of the first coil connect to the first terminal of the first coil branch, and second terminal of the second coil branch, respectively; the initial lead and the end lead of the third coil connect to the first terminal of the second coil branch and second terminal of the fifth coil branch, respectively.

10. A base with integrated coils of claim 9, further comprises a first coil, a second coil, a third coil and a fourth coil which are set apart; the branches further comprise a third coil branch, a fourth coil branch and a sixth coil branch; the first coil branch, the fifth coil branch, the third coil branch and the sixth coil branch all include pins exposed outside the insulating base; the third coil branch includes a pin on one side and a first terminal on the other side; the fourth coil branch includes a second terminal on one side and a first terminal on the other side; the sixth coil branch includes a pin on one side and a second terminal on the other side; the second coil and the fourth coil are arranged opposite to each other and connected in series; the initial lead and the end lead of the second coil connect to the first terminal of the third coil branch, and second terminal of the fourth coil branch, respectively; the initial lead and the end lead of the fourth coil connect to the first terminal of the fourth coil branch and second terminal of the sixth coil branch, respectively.

11. A base with integrated coils of claim 10, wherein the insulating base includes a top surface and a bottom surface opposite to the top surface, and the coil is horizontally configured on the top surface, and the connection terminals are exposed on the top surface.

12. A base with integrated coils of claim 11, further comprising: four side surfaces and a through-hole throughout the top surface and bottom surface; and the through-holes has a annular inner wall, between which and the side surfaces there is an installation area; the installation area comprises four sub-installation areas; each coil is positioned along the length direction of the side surface, and the connection terminals of the coils are located between the two adjacent sub-installation areas.

13. A base with integrated coils of claim 8, further comprising: electronic components that are set on the insulating base and electrically connected to the metal circuit; the electronic components are positioned near the coils' connection terminals; the plastic locating block consists of an electronic component connection part and a connecting structure between the coil connection part and the electronic component connection part; the connection terminals electrically connected to the electronic components, have connection surfaces which are exposed on the electronic component connection part; the top surface of the electronic component connection part is flush with the top surface of the second connection block.

14. A base with integrated coils of claim 13, wherein the top surface of the electronic component connection part is concave to form an accommodating cavity; the connection terminals electrically connected to the electronic components, are exposed on the bottom surface of the accommodating cavity; the electronic component is electrically connected to the connection terminals in the accommodating cavity; the top surface of the electronic component connection part is higher than the top surface of the electronic component along the thickness direction of the coil.

15. A base with integrated coils of claim 14, wherein connection parts are configured between the pins of the branch and the connection terminals, as well as between the first terminal and the second terminal; the portions of the connection part near the connection terminal, the first terminal, and the second terminal are all bent to form bending parts; the connection parts are all setup in a first horizontal plane; the bending parts of the branch, which electrically connects to the coil, bend upward from the connection parts along the thickness direction of the coil; the connection surfaces of the first terminal and the second terminal are higher than the first horizontal plane; the bending parts of the branch, which electrically connects to the electronic component, bend downward from the connection part along the thickness direction of the coil; the connection surfaces of the connection terminal, which electrically connect to the electronic component, are lower than the first horizontal plane, and the top surface of the electronic component is lower than the connection surface of the second terminal.

16. A base with integrated coils of claim 14, wherein the coil comprises a cavity within its coil body, where an electronic component is arranged along the thickness direction of the coil, with its position away from the coil body.

17. A base with integrated coils of claim 13, wherein the electronic component is a hall sensing element or an integrated circuit integrated with a hall sensing element.

18. A motor base with integrated coils of claim 1, wherein the insulating base further comprises:
an accommodating section for accommodating the first terminal connecting to the initial lead and the second terminal connecting to the end lead;
a holding section for placing the coil;
wherein the accommodating section is configured at the end and/or the side of the holding section;
the accommodating slot extends towards the holding section corresponding to the initial lead.

19. A base with integrated coils of claim 18, wherein a lead slot configured between the accommodating section and the holding section, extends at an angle along the holding section to the accommodating section, or extends arcuately along the holding section to the accommodating section.

20. A base with integrated coils of claim 19, wherein the accommodating slot extends to and connects to the lead slot corresponding to the initial lead.

21. A base with integrated coils of claim 20, wherein a chamfer is configured at the connecting part between the lead slot and accommodating slot, or the holding section.

22. A motor base with integrated coils of claim 21, wherein the accommodating slot is formed by further recessing the bottom surface of the holding section; the accommodating section connecting to the lead slot, is a groove that is recessed into the insulating base.

23. A base with integrated coils of claim 22, wherein a solder layer is configured at the connecting part of the connection terminals corresponding to the initial lead and the end lead; an adhesive layer is configured in the accommodating section to fix the initial lead and the end lead.

24. A base with integrated coils of claim 1, wherein the insulating base comprises a protrusion part corresponding to the end lead, and the protrusion part is recessed to form a positioning slot, where the end lead is located.

25. A motor, comprising:
a base with integrated coils of claim 1;
a shell body, configured above the base with integrated coils;
a movable module, used to accommodate the shell body, further comprising a magnetic element cooperating with coil.

26. A motor of claim 25, wherein the coil is configured as a driving coil to move the movable module, or a stabilizing coil to prevent vibration of the movable module, or a damping coil to control the motor's movement.

27. A base with integrated coils of claim 1, wherein both the first terminal and the second terminal are equipped with connection surfaces that are electrically connected to the corresponding initial lead and end lead, respectively; the first terminal is lower than the second terminal in the thickness direction of the coil, and the connection surface of the second terminal is higher than the connection surface of the first terminal in the thickness direction of the coil.

* * * * *